US012390957B2

(12) United States Patent
Schlusselbauer et al.

(10) Patent No.: US 12,390,957 B2
(45) Date of Patent: Aug. 19, 2025

(54) MOULD CORE FOR A MOULD FOR PRODUCING HOLLOW CONCRETE BODIES, AND A MOULDING DEVICE HAVING A MOULD CORE OF THIS KIND

(71) Applicants: Johann Schlusselbauer, Bad Schallerbach (AT); Ulrich Schlusselbauer, Altenhof am Hausruck (AT)

(72) Inventors: Johann Schlusselbauer, Bad Schallerbach (AT); Ulrich Schlusselbauer, Altenhof am Hausruck (AT)

(73) Assignees: Johann Schlusselbauer, Bad Schallerbach (AT); Ulrich Schlusselbauer, Altenhof am Hausruck (AT)

( * ) Notice: Subject to any disclaimer, the term of this patent is extended or adjusted under 35 U.S.C. 154(b) by 291 days.

(21) Appl. No.: 17/917,537

(22) PCT Filed: Apr. 6, 2021

(86) PCT No.: PCT/EP2021/058925
§ 371 (c)(1),
(2) Date: Oct. 6, 2022

(87) PCT Pub. No.: WO2021/204793
PCT Pub. Date: Oct. 14, 2021

(65) Prior Publication Data

US 2023/0146450 A1 May 11, 2023

(30) Foreign Application Priority Data

Apr. 6, 2020 (DE) ..................... 10 2020 204 417.1

(51) Int. Cl.
*B28B 21/88* (2006.01)
*B28B 7/34* (2006.01)

(52) U.S. Cl.
CPC .............. *B28B 21/88* (2013.01); *B28B 7/348* (2013.01)

(58) Field of Classification Search
CPC .......... B28B 7/306; B28B 7/348; B28B 21/88
See application file for complete search history.

(56) References Cited

U.S. PATENT DOCUMENTS 1,394,570 A 10/1921 Mitchell
3,570,802 A 3/1971 Miller
3,815,864 A 6/1974 Loeber

FOREIGN PATENT DOCUMENTS

DE 1459257 A1 11/1968
DE 1684312 A1 4/1971
(Continued)

OTHER PUBLICATIONS

German Patent Office, Examination Report, Application No. DE102020204416 dated Jan. 7, 2021, in 9 pages.
(Continued)

*Primary Examiner* — James Sanders
(74) *Attorney, Agent, or Firm* — Procopio, Cory, Hargreaves & Savitch LLP

(57) ABSTRACT

The present disclosure relates to a mold core for use on a molding apparatus for the production of hollow and/or in particular tubular concrete bodies, and a molding apparatus comprising such a mold core. The mold core comprises a longitudinally extending wall of the core, which has a wall of the core from one end to the other end of the wall of the core in the longitudinal direction, an expansion device for expanding and/or spreading and/or contracting and/or shrinking the mold core, and a sealing element sealing the longitudinal opening of the wall of the core. The sealing
(Continued)

element is provided with respective longitudinal edges of the wall of the core by means of a detachable connection, the sealing member being slidably connected to the two longitudinal edges of the wall of the core in the longitudinal direction, respectively.

13 Claims, 15 Drawing Sheets

(56) References Cited

FOREIGN PATENT DOCUMENTS

| | | | |
|---|---|---|---|
| DE | 2422202 | A1 | 11/1975 |
| DE | 69317274 | T2 | 6/1993 |
| DE | 9402729 | U1 | 4/1994 |
| DE | 102010048053 | A1 | 4/2012 |
| DE | 102012220814 | A1 | 5/2014 |
| EP | 0152040 | A2 | 8/1985 |
| EP | 0630727 | A1 | 12/1994 |
| FR | 59252 | E | 8/1948 |
| GB | 954390 | A | 4/1964 |
| JP | 2000084919 | A | 3/2000 |
| JP | 2003001620 | A | 1/2003 |
| JP | 2006240027 | A | 9/2006 |
| SU | 468781 | A1 | 4/1975 |

OTHER PUBLICATIONS

German Patent Office, Examination Report, Application No. DE102020204417 dated Jan. 7, 2021, in 10 pages.

Patent Cooperation Treaty, Written Opinion of ISA for Application No. PCT/EP2021/058925, dated Nov. 23, 2021, in 8 pages.

Patent Cooperation Treaty, Written Opinion of ISA for Application No. PCT/EP2021/058924, dated Jul. 7, 2021, in 14 pages.

Examination report and Written Opinion dated Oct. 9, 2024, in European application No. 21719061.0.

MOULD CORE FOR A MOULD FOR PRODUCING HOLLOW CONCRETE BODIES, AND A MOULDING DEVICE HAVING A MOULD CORE OF THIS KIND

CROSS-REFERENCE TO RELATED APPLICATIONS

This application is a US national stage application of International Application PCT/EP2021/058925, filed Apr. 6, 2021, the contents of which are incorporated by reference.

DESCRIPTION

The present disclosure relates to a mold core for a molding apparatus for producing hollow and/or in particular tubular concrete bodies and a molding apparatus having such a mold core for producing hollow and/or in particular tubular concrete bodies. Furthermore, the present disclosure relates to a sealing element, in particular a strip-shaped sealing element, and/or a longitudinal strip forming such a sealing element for use on such a mold core.

BACKGROUND

Mold cores for molding apparatuses for the production of hollow and/or tubular concrete bodies have been known in the prior art for a long time. For example, U.S. Pat. No. 1,394,570, published in 1921, shows a generic mold core for use as an inner mold for a molding apparatus for the production of hollow and/or in particular tubular concrete bodies. The mold core of U.S. Pat. No. 1,394,570 has a spreadable and/or expandable core which, in the expanded and/or expanded state, assumes the specified inner shape for the concrete casting process and is designed to be shrinkable and/or contractible for demolding the concrete body. Such expandable mold cores are also regularly referred to as collapsible cores in the prior art. Collapsible cores of this type facilitate demolding of a concrete body formed between an outer wall of the core of the molding apparatus and the collapsible core, in that the collapsible core can be shrunk from the spread set-up state assumed during the concrete pouring process and is thereby lifted off the inner wall of the concrete body.

Another generic mold core and/or collapsible core for use as an inner mold for a molding apparatus for producing hollow and/or in particular tubular concrete bodies is described in DE 10 2012 220 814 A1. The collapsible core according to DE 10 2012 220 814 A1 has an substantially cylindrical wall of the core (core mantle), which has an opening extending in the longitudinal direction on one side, on the opposite longitudinal edge sections of which a spreading device arranged inside the wall of the core engages in order to expand the opposite longitudinal edge sections of the wall of the core to spread the collapsible core apart in the tangential direction. In order to seal the opening, which extends in the longitudinal direction, towards the inside of the collapsible core, in particular when the collapsible core is in the expanded set-up state in which the concrete pouring process is carried out, according to DE 10 2012 220 814 A1, a connecting strip, which extends in the longitudinal direction, is provided between the opposite longitudinal edge sections and has at least one elastomeric portion, wherein the connecting strip is shear-resistant connected to the longitudinal edges of the wall of the core. This enables a permanent sealing connection of the two longitudinal edges of the wall of the core, both during the expansion process and during the shrinking process, so that the tightness of the wall of the core that is effective in all positions of the collapsible core can be ensured over the entire circumference. In the arrangement proposed in DE 10 2012 220 814 A1, a very good sealing of the interior of the collapsible core can be provided. However, during the expansion processes when setting up the collapsible core and/or the shrinking processes when removing the formwork from a concrete body, the elastomeric connecting strip is always exposed to alternating bending stresses, which leads to material fatigue that is disadvantageous for the service life, so that wear-related leaks can occur on the connecting strip and/or the connection to the longitudinal edges of the wall of the core can partially or completely tear off.

In view of the disadvantages described above, based on the prior art described above, it is an object of the present disclosure to provide a mold core for a molding apparatus for the production of hollow and/or in particular tubular concrete bodies and a molding apparatus having such a mold core for the production of hollow and/or in particular to provide tubular concrete bodies, in which a cost-effective arrangement can be provided that reliably seals the wall of the core inwards, which enables improved service live, is able to reduce material fatigue and/or wear and/or allows easier handling in the event of material fatigue and/or wear.

SUMMARY

The present disclosure relates to a mold core for a molding apparatus for producing hollow and/or in particular tubular concrete bodies and a molding apparatus having such a mold core for producing hollow and/or in particular tubular concrete bodies. Furthermore, a sealing element for use on such a mold core is proposed.

According to an exemplary aspect, a mold core is proposed for use on a molding apparatus for the production of hollow and/or in particular tubular concrete bodies, the mold core comprising: a longitudinally extending core mantle, which particularly preferably has a strip-shaped longitudinal opening extending in the longitudinal direction of the core mantle (preferably at least from one end to the other end of the core mantle) between two longitudinal edges of the core mantle, an expansion device for expanding and/or spreading and/or contracting and/or shrinking the mold core, and/or a sealing element sealing the longitudinal opening of the core mantle. The sealing element is preferably provided as a sealing element that deforms flexibly and/or elastically when the mold core contracts and/or shrinks and, in the shrunken or contracted state of the mold core, in particular by bending and in particular about a longitudinal axis, preferably folds inwards (or outwards), in particular relative to the core mantle.

According to particularly expedient examples, the sealing element can be connected to the core mantle so that it can be slidably displaced in the longitudinal direction, in particular, the sealing element can be connected to the two longitudinal edges of the core mantle so that it can be slidably displaced in the longitudinal direction. This has the advantage that the sealing element can be removed easily, efficiently and inexpensively due to the slidably displaceable connection in order to be replaced with another sealing element (spare part) if necessary, e.g. without having to remove the mold core from the molding apparatus.

According to particularly expedient examples, the sealing element can be attached to the respective longitudinal edges of the core mantle by a respective detachable connection. This has the advantage that the sealing element can be removed easily, efficiently and inexpensively due to the detachable connection in order to be replaced with another sealing element (spare part) if necessary, e.g. without having to remove the mold core from the molding apparatus. According to particularly expedient examples, the sealing element can be held in particular on the mold core so that it can be pulled out of the mold core in the longitudinal direction. In particular, the sealing element on the mold core can be pulled out of the longitudinal opening of the core mantle in the longitudinal direction and/or be held in a manner allowed to be pulled out from between the longitudinal edges of the core mantle, for example, in particular be pulled out in the longitudinal direction along the longitudinal edges of the core mantle. This has the advantage that the sealing element can be removed easily, efficiently and inexpensively by simply pulling it out in the longitudinal direction of the mold core in order to be replaced with another sealing element (spare part) if necessary, e.g. without having to remove the mold core from the molding apparatus.

According to particularly expedient examples, the sealing element can be connected with its longitudinal edges to the respective longitudinal edges of the core mantle (respectively) in a slidably displaceable manner in the longitudinal direction. In particular, respective longitudinal edges of the sealing element facing the longitudinal edges of the core mantle can each be connected to the respective longitudinal edges of the core mantle in a slidably displaceable manner in the longitudinal direction. This has the advantage that the sealing element can be removed easily, efficiently and inexpensively due to the slidably displaceable connection in order to be replaced with another sealing element (spare part) if necessary, e.g. without having to remove the mold core from the molding apparatus.

According to particularly expedient examples, the sealing element can be positively (form-fit positive lock) connected to (and/or with) the respective longitudinal edges of the core mantle in the direction transverse to the longitudinal direction of the mold core, particularly preferably in the substantially radial direction of the mold core and/or substantially perpendicular to the radial direction of the mold core relative to the mold core. Particularly preferably, the sealing element can be positively connected to (and/or with) the respective longitudinal edges of the core mantle in substantially all directions transverse to the longitudinal direction of the mold core, particularly preferably in the substantially radial direction of the mold core inwards and/or outwards and/or substantially in both directions perpendicular to the radial direction of the mold core relative to the mold core. This has the advantage that the sealing element can be held in such a way (preferably in a sealing manner) that substantially only the longitudinal direction remains as a translatory degree of freedom. According to particularly expedient examples, the sealing element can have lateral connecting strips which extend in the longitudinal direction and/or are fastened to the side and which can be held slidably displaceably in the longitudinal direction, preferably on the longitudinal edges of the core mantle, in particular on respective fastening strips fastened to the longitudinal edges of the core mantle.

According to particularly expedient examples, the connecting strips of the sealing element can have one or more profile groove sections extending in the longitudinal direction, in which preferably respective corresponding profile rail sections of the longitudinal edges, in particular of the fastening strips fastened to the longitudinal edges of the wall of the core, engage in a longitudinally slidably displaceable manner and/or are fitted in a longitudinally slidably displaceable manner. Alternatively or additionally, the connecting strips of the sealing element can have one or more profile rail sections extending in the longitudinal direction, which can preferably engage in the respective corresponding profile groove sections of the longitudinal edges, in particular the fastening strips fastened to the longitudinal edges of the wall of the core, in a longitudinally slidably displaceable manner and/or are fitted in a longitudinally slidably displaceable manner. According to particularly expedient examples, one or more profile groove sections and/or their corresponding one or more profile rail sections can have a T-shape in cross-sectional profile.

According to particularly expedient examples, the sealing element can have a flexible and/or elastically bendable connection band which, in particular, preferably can comprise an elastic plastic, in particular an elastomer. According to particularly expedient examples, the connecting band of the sealing element can be arranged between the connecting strips of the sealing element and/or can be connected to the connecting strips on both sides, respectively. According to particularly expedient examples, the connecting band of the sealing element can be attached to the connecting strips by a non-positive connection, particularly preferably by an adhesive connection. According to particularly expedient examples, the connecting strips of the sealing element can each have one or more retaining profile sections, in particular anchor and/or nose profile sections, protruding and/or engaging into the material of the connecting band in the cross-sectional profile. According to particularly expedient examples, at least one of the connecting strips of the sealing element can have, in the cross-sectional profile, a plurality of retaining profile sections which are aligned transversely to one another and/or project into and/or engage in the material of the connecting band.

According to a further exemplary aspect, a sealing element (e.g. also available as a spare part) for use on a mold core according to one of the above examples is proposed, with the sealing element or its lateral longitudinal edges (in particular facing the longitudinal edges of the wall of the core) preferably being configured to be connected to the longitudinal edges of the core mantle respectively in a slidably displaceable manner in the longitudinal direction, and particularly preferably to be fastenable to respective longitudinal edges of the core mantle by respective detachable connections.

According to particularly expedient examples, the sealing element or its lateral longitudinal edges (in particular facing the longitudinal edges of the core mantle) can be configured to be connected to the core mantle in a longitudinally slidable displaceable manner, particularly preferably, the sealing element can be connected slidably displaceable in the longitudinal direction with respect to the two longitudinal edges of the core mantle.

According to particularly expedient examples, the sealing element or its lateral longitudinal edges (in particular facing the longitudinal edges of the core mantle) can be designed to be attached to (and/or with) the respective longitudinal edges of the core mantle by respective detachable connections. According to particularly expedient examples, the sealing element or its lateral longitudinal edges (especially those facing the longitudinal edges of the core mantle) can be configured to be held in particular on the mold core so that it can be pulled out of the mold core in the longitudinal direction. In particular, the sealing element or its lateral longitudinal edges (in particular those facing the longitudinal edges of the core mantle) can be configured to be able to be pulled out of the longitudinal opening of the core mantle of the mold core in the longitudinal direction and/or to be held in a pull-out manner, for example, between the longitudinal edges of the core mantle, in particular to be held to be pulled out respectively at the respective longitudinal edges of the core mantle in the longitudinal direction.

According to particularly expedient examples, the sealing element can be configured with its lateral longitudinal edges (in particular facing the longitudinal edges of the core mantle) or its lateral longitudinal edges (in particular facing the longitudinal edges of the core mantle) can be configured to be slidably connected at (and/or with) the respective longitudinal edges of the core mantle in the longitudinal direction. In particular, respective longitudinal edges of the sealing element facing the longitudinal edges of the core mantle can each be configured to be slidably displaceably connected to/with the respective longitudinal edges of the core mantle in the longitudinal direction.

According to particularly expedient examples, the sealing element can be configured with its lateral longitudinal edges (in particular facing the longitudinal edges of the core mantle) or its lateral longitudinal edges (in particular facing the longitudinal edges of the core mantle) can be configured to be positively connected in a form-fitting manner at (and/or with) the respective longitudinal edges of the core mantle in the direction transverse to the longitudinal direction of the mold core, particularly preferably in the substantially radial direction of the mold core and/or substantially perpendicular to the radial direction of the mold core relative to the mold core. Particularly preferably, the sealing element can be configured with its lateral longitudinal edges (in particular facing the longitudinal edges of the core mantle) or its lateral longitudinal edges (in particular facing the longitudinal edges of the core mantle) can be configured to be positively connected in a form-fitting manner at (and/or with) the respective longitudinal edges of the core mantle in substantially all directions transverse to the longitudinal direction of the mold core, particularly preferably in the substantially radial direction of the mold core inwards and/or outwards and/or substantially in both directions perpendicular to the radial direction of the mold core relative to the mold core. According to particularly expedient examples, the sealing element can have lateral longitudinally extending connecting strips (e.g. along the longitudinal edges of the sealing element and/or forming the longitudinal edges of the sealing element) and/or laterally fastened connecting strips which are preferably configured to attach to the longitudinal edges of the core mantle, in particular on respective fastening strips fastened to the longitudinal edges of the core mantle, in each case to be slidably held in the longitudinal direction.

According to particularly expedient examples, the connecting strips of the sealing element can have one or more profile groove sections extending in the longitudinal direction, in which preferably respective corresponding profile rail sections of the longitudinal edges of the core mantle, in particular of the fastening strips fastened to the longitudinal edges of the core mantle, can engage in a longitudinally slidably displaceable manner and/or are fitted in a longitudinally slidably displaceable manner. Alternatively or additionally, the connecting strips of the sealing element can have one or more profile rail sections extending in the longitudinal direction, which can preferably engage in the respective corresponding profile groove sections of the longitudinal edges of the core mantle, in particular the fastening strips fastened to the longitudinal edges of the core mantle, in a longitudinally slidably displaceable manner and/or are fitted in a longitudinally slidably displaceable manner. According to particularly expedient examples, one or more profile groove sections and/or their corresponding one or more profile rail sections can have a T-shape in cross-sectional profile.

According to particularly expedient examples, the sealing element can have a flexible and/or elastically bendable connecting band which, in particular, preferably can comprise an elastic plastic, in particular an elastomer. According to particularly expedient examples, the connecting band of the sealing element can be arranged between the connecting strips of the sealing element and/or can be connected to the connecting strips on both sides. According to particularly expedient examples, the connecting band of the sealing element can be attached to the connecting strips by a non-positive connection, particularly preferably by an adhesive connection. According to particularly expedient examples, the connecting strips of the sealing element can each have one or more retaining profile sections, in particular anchor and/or nose profile sections, protruding and/or engaging into the material of the connecting band in the cross-sectional profile. According to particularly expedient examples, at least one of the connecting strips of the sealing element can have, in the cross-sectional profile, a plurality of retaining profile sections which are aligned transversely to one another and/or project into and/or engage in the material of the connecting band.

According to a further exemplary aspect, a molding apparatus for the production of hollow and/or in particular tubular concrete bodies is also proposed, comprising an outer mold and an inner mold which is preferably arranged and/or can be arranged in the outer mold and which preferably has a mold core according to one of the above aspects and/or examples.

Further preferred examples of the mold core and/or sealing element are described below, which can be combined with the above aspects and expedient examples.

The sealing element is preferably provided as a sealing element that deforms flexibly and/or elastically when the mold core contracts and/or shrinks and, in the shrunken or contracted state of the mold core, preferably folds inwards (or outwards), in particular relative to the core mantle, in particular by bending, in particular about a longitudinal axis.

According to particularly expedient examples, one or more guide elements can be arranged on the side of the sealing element facing the interior of the mold core. According to particularly expedient examples, the expansion device can be configured to bring the mold core from the expanded or spread state into the contracted or shrunken state in at least two successive shrinking processes. In particular, the expansion device can preferably be configured to bring the mold core from the expanded or spread state into the contracted or shrunk state in at least two consecutive shrinking processes in that at least one driver section of the expansion device comes into contact with at least one entrainment section of the one or more guide elements of the sealing element in the transition from a first shrinking process of the at least two consecutive performed shrinking processes to a second shrinking process of the at least two successively performed shrinking processes, in particular for guiding the sealing element in (or during) the second shrinking process (and possibly in or during further shrinking processes). The formulation of the two or more shrinking processes means in particular that the expansion device already partially shrinks or contracts the mold core in a first shrinking process and in at least one further shrinking process further shrinks or contracts the mold core from the partially shrunken or partially contracted state in order to bring the mold core in the last of the at least two shrinkage processes into the contracted or shrunken state. This does not rule out that the shrinking processes can continuously merge into one another, with the transition from the first to at least one further second shrinking process being recognizable in that, after partial shrinkage or contraction of the mold core has already taken place, at least one driver section of the expansion device comes into contact with at least one entrainment section of the one or more guide elements of the sealing element in the transition from the first to the second shrinking process. In particular, this means that the at least one driver section of the expansion device is not yet in contact or nor does it come into contact with the at least one driver section of the one or more guide elements in the first shrinking process, but only after the shrinkage or contraction of the mold core has already partially taken place. This has the advantage that no tensile forces are exerted on the sealing element in the first shrinking process, but the sealing element can be advantageously guided in the subsequent second shrinking process. This prevents excessive wear of the sealing element due to the avoidance of tensile forces acting on the sealing element.

According to particularly expedient examples, the expansion device can also be configured to engage, in the transition from the first to the second shrinking process, on/with the one or more guide elements and/or to come into contact or driving contact element with the one or more guide elements, and to guide the sealing element in the second shrinking process, in particular with engagement and/or contact on the one or more guide members. This has the advantage that no tensile forces are exerted on the sealing element in the first shrinking process, but the sealing element can be advantageously guided in the subsequent second shrinking process. This prevents excessive wear of the sealing element due to the avoidance of tensile forces acting on the sealing element.

According to particularly expedient examples, one or more guide elements of the sealing element can each have a spacer sleeve, in particular a respective spacer sleeve with one of the at least one entrainment sections, with the respective entrainment section of the spacer sleeve preferably being spaced from the side of the sealing element facing the interior of the mold core. According to particularly expedient examples, the at least one driver section of the expansion device can preferably be moved inward relative to the mold core during contraction or shrinkage of the mold core and/or preferably come into contact with the at least one driver section of the respective spacer sleeve of the guide elements in the transition from the first to the second shrinking process, and/or the at least one driver section of the expansion device can preferably guide and/or take along (pull) the one or more guide elements of the sealing element in the second shrinking process. This has the advantage that no tensile forces are exerted on the sealing element in the first shrinking process, but the sealing element can be advantageously guided in the subsequent second shrinking process. This prevents excessive wear of the sealing element due to the avoidance of tensile forces acting on the sealing element.

According to particularly expedient examples, the expansion device can comprise a shaped element which, in the expanded or spread state of the mold core, bears against the side of the sealing element facing the interior of the mold core and/or is moved inward relative to the mold core when the mold core contracts or shrinks. According to particularly expedient examples, the shaped element can have the at least one driver section of the expansion device. According to particularly expedient examples, the shaped element can be a shaped sheet metal extending in the longitudinal direction of the mold core, and the at least one driver section of the expansion device can be formed by a respective borehole in the shaped sheet metal, through which the respective spacer sleeve of the guide element or of the one or more guide elements can extend. According to particularly expedient examples, the at least one entrainment section of the respective spacer sleeve of the guide element or of the one or more guide elements can be arranged on the side of the shaped sheet metal facing away from the sealing element. According to particularly expedient examples, the entrainment section of the respective spacer sleeve of the guide element or of the one or more guide elements can be at a distance from the side of the sealing element facing the interior of the mold core, which distance is preferably greater than the sheet metal thickness of the shaped sheet. According to particularly expedient examples, one or more guide elements can each have a stamping section on the side facing the sealing element, which preferably engages and/or is fitted into a groove section of the sealing element, the groove section of the sealing element particularly preferably having substantially a T-shape in cross-sectional profile. According to particularly expedient examples, the stamping section can engage and/or be fitted in a direction transverse to the longitudinal direction of the mold core in a positively connected manner in the groove section of the sealing element, particularly preferably in the radial direction of the mold core and/or substantially perpendicular to the radial direction of the mold core. According to particularly expedient examples, the stamping section of the respective guide element can engage in the groove section of the sealing element in a slidably displaceable manner in the longitudinal direction of the mold core. According to particularly expedient examples, the sealing element can have a connecting band on which a guide strip which has the groove section and extends in the longitudinal direction of the mold core is preferably arranged.

According to a further exemplary aspect, a sealing element (e.g. also available as a spare part) for use on a mold core according to one of the above examples is proposed, with the sealing element preferably being able to be fastened to the respective longitudinal edges of the longitudinal opening of the core mantle by a detachable connection. Furthermore, one or more guide elements can be arranged on the side of the sealing element that faces the interior of the mold core (in the fastened state). According to particularly expedient examples, the sealing element or the one or more guide elements can be configured and/or designed in such a way that at least one driver section of the expansion device comes or can come into contact with at least one entrainment section of the one or more guide elements of the sealing element (in the fastened state) in the transition from a first shrinking process of the at least two shrinking processes carried out in succession to a second shrinking process of the at least two in succession performed shrinking processes, in particular for guiding the sealing element in (or during) the second shrinking process (and possibly in or during further shrinking processes). The sealing element preferably has a connecting band on which a guide strip, which has the groove section and extends in the longitudinal direction of the mold core, is preferably arranged. Further examples of the sealing element are described above and/or below.

According to a further exemplary aspect, a molding apparatus for the production of hollow and/or in particular tubular concrete bodies is also proposed, comprising an outer mold and an inner mold which is preferably arranged and/or can be arranged in the outer mold and which preferably has a mold core according to one of the above aspects and/or examples.

Further aspects and their advantages, as well as advantages and more specific implementation options of the aspects and features described above, are described in the following descriptions and explanations relating to the attached figures, but these are in no way to be understood as limiting.

DETAILED DESCRIPTION OF THE FIGURES AND PREFERRED EXAMPLES

Preferred examples and/or examples of the present disclosure are described in detail below with reference to the attached figures. Identical and/or similar elements in the figures can be denoted by the same reference numbers, but sometimes also by different reference numbers. It should be emphasized that the present disclosure is in no way limited and/or restricted to the examples described below and their design features, but also includes modifications of the examples, in particular those that are obtained by modifications of the features of the examples described and/or by combination of one or more of the features of the examples described are included within the scope of the independent claims.

Figure 1:
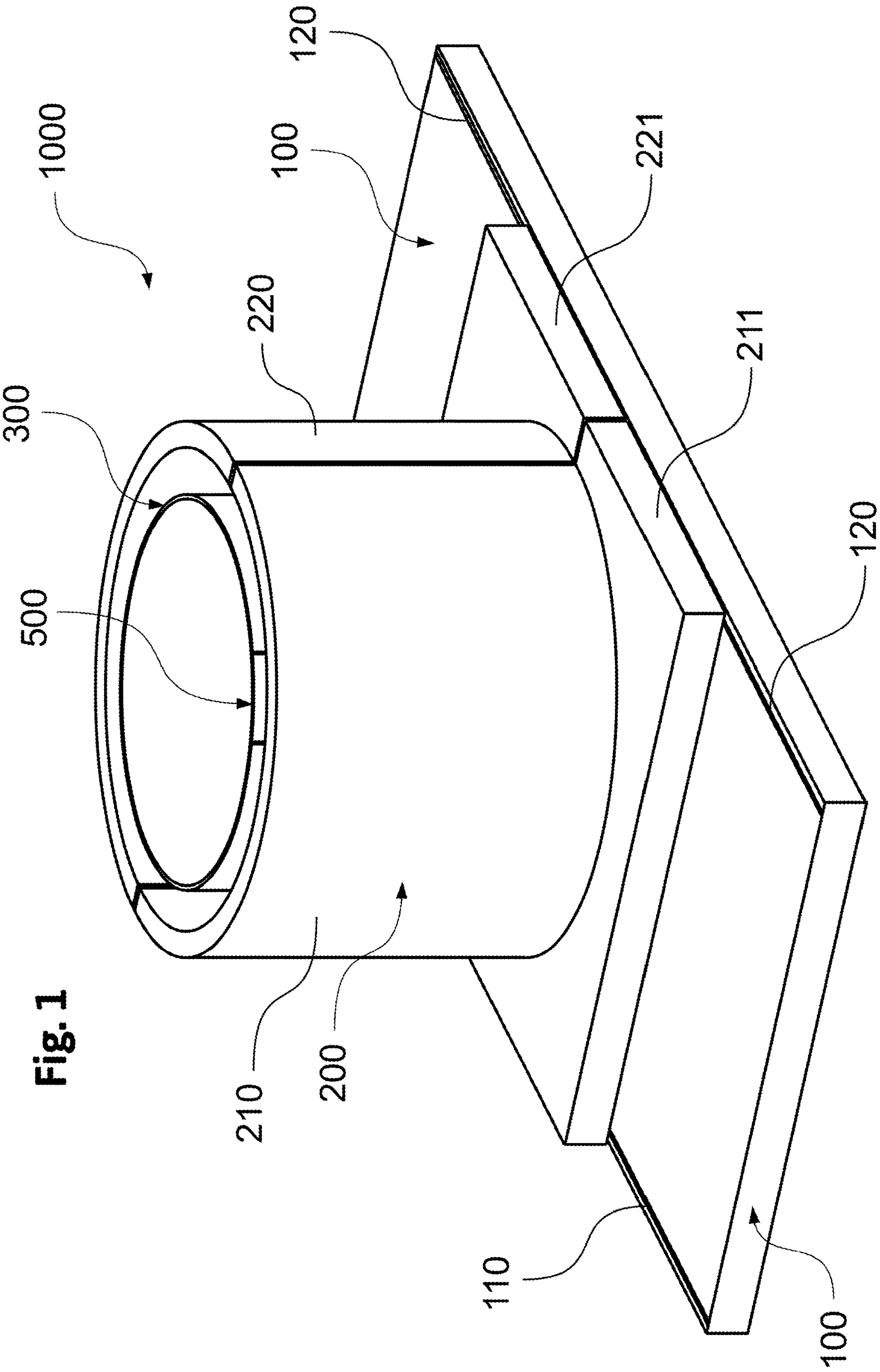
FIG. 1 shows an exemplary perspective view of a molding apparatus for producing tubular concrete bodies according to an exemplary embodiment of the present disclosure.
Figure 2:
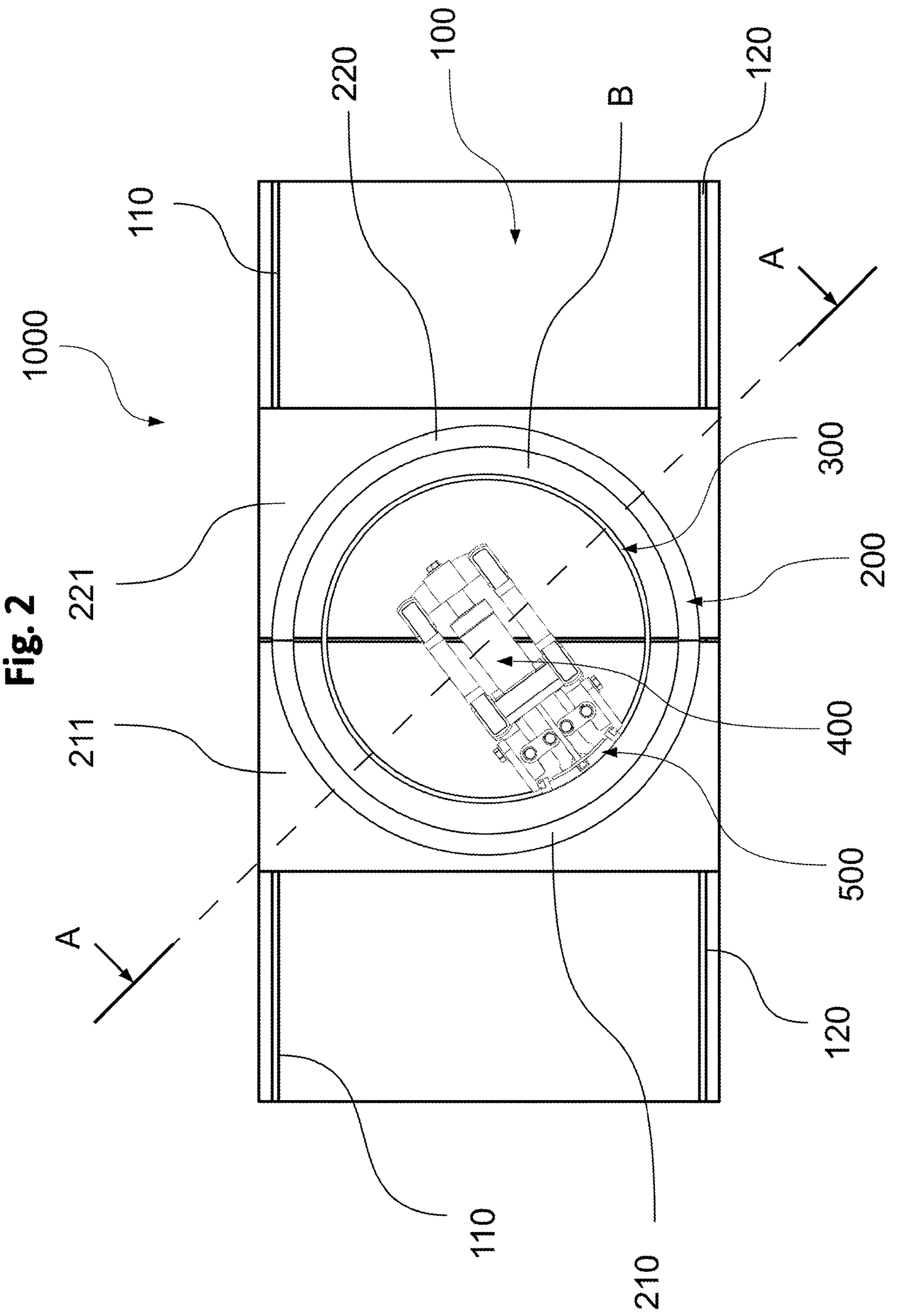
FIG. 2 shows an exemplary plan view of the exemplary molding apparatus of FIG. 1.
Figure 3:
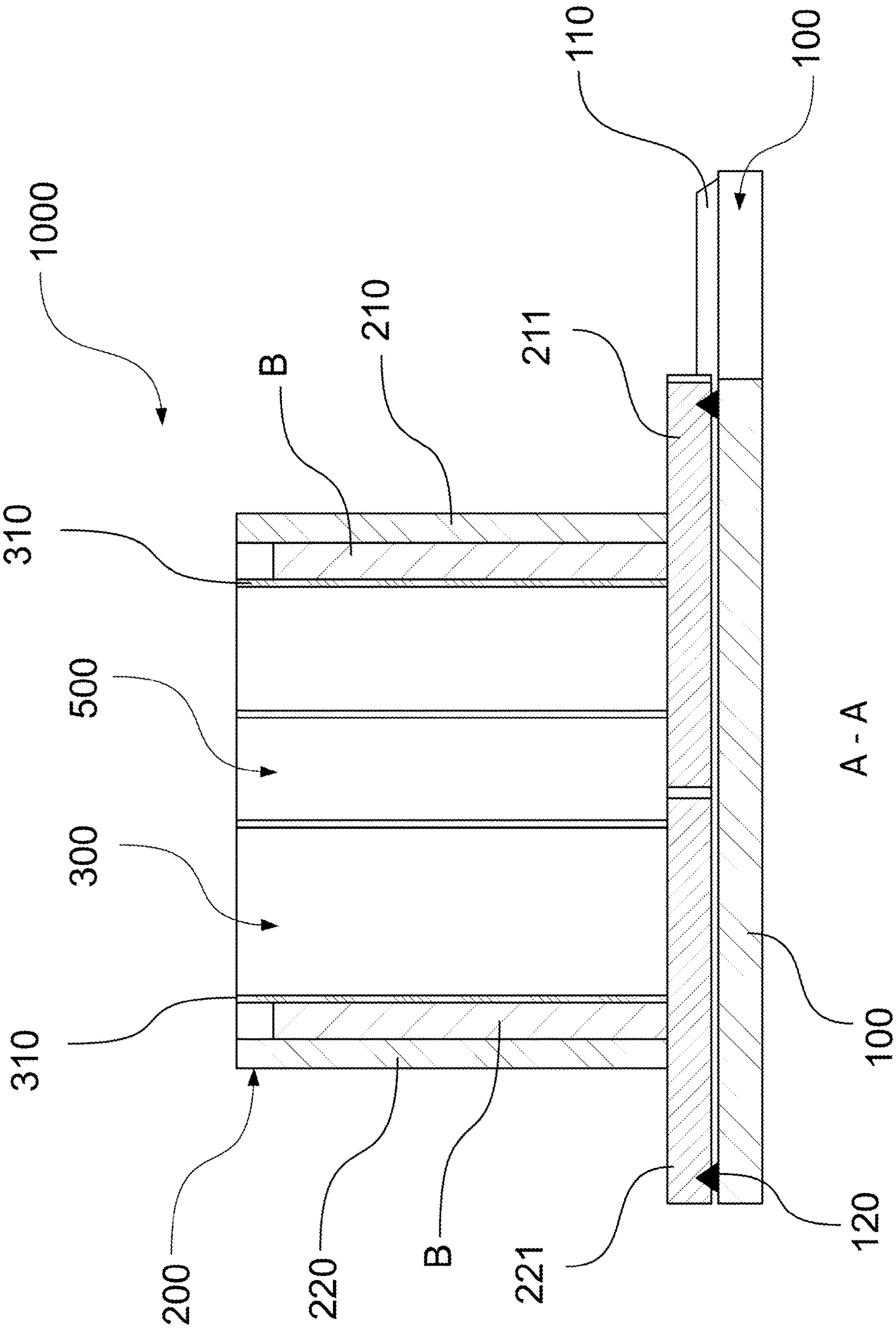
FIG. 3 shows an exemplary cross-sectional view of the exemplary molding apparatus of FIG. 1 (section A-A of FIG. 2)

FIG. 1 shows an exemplary perspective view of a molding apparatus 1000 for producing tubular concrete bodies according to an exemplary embodiment of the present disclosure. FIG. 2 shows an example top view of the example molding apparatus 1000 of FIG. 1. FIG. 3 shows an example cross-sectional view of the example molding apparatus 1000 of FIG. 1 (section A-A of FIG. 2). For example, the molding apparatus 1000 is herein configured to produce cylindrical concrete pipes that have a substantially circular cross section with a wall thickness that is substantially constant over the circumference (i.e., for example, with substantially coaxial circular inner and outer cross-sectional shapes). However, further exemplary embodiments with other inner and/or outer shapes can be provided, in which hollow and/or tubular concrete bodies can be produced, the outer and/or inner shape of which deviates from the circular shape in cross-section, e.g. with oval, elliptical, angular (possibly with rounded corners) cross-sectional shapes outside and/or inside and/or with inside and/or outside shape centers deviating from the coaxial arrangement.

The molding apparatus 1000 of the exemplary embodiment according to FIGS. 1, 2 and 3 comprises, by way of example, a stand section 100 on which an outer mold 200 comprising two outer mold sections 210 and 220 is arranged. In this case, both outer mold sections 210 and 220 are formed, purely by way of example, substantially as semi-hollow cylindrical elements which, when put together, form the outer mold 200, which is in the form of a hollow cylinder, for example. In further examples, the outer mold can be composed of two or more identical and/or differently shaped outer mold sections. The outer mold sections 210 and 220 of the outer mold 200 of the example according to FIGS. 1 and 2 are arranged on respective carriage sections 211 and 221, for example. By means of the carriage sections 211 and 221, which are slidably displaceably mounted on rails 110 and 120, which are arranged, for example, on the stand section 100, the outer mold sections 210 and 220 can be moved apart and/or away from each other, for example, for demoulding a concrete body B produced in the molding apparatus 1000 from the set-up state shown in FIG. 1 to be moved to release the concrete body inside. In the set-up process, e.g. before the next concrete pouring process, the outer mold sections 210 and 220 can be moved towards one another and/or brought together again in order to be assembled and/or fastened to one another in the set-up state shown as an example in FIG. 1. In the set-up state, the inner wall of the outer mold sections 210 and 220 forms, for example, substantially a cylinder shape (hollow cylinder inner wall), which at least partially forms the outer wall of the concrete body to be produced.

The molding apparatus 1000 of the embodiment according to FIGS. 1, 2 and 3 further includes a mold core 300 forming the inner mold. The mold core 300 and/or its outer shape substantially forms a (vertical) cylindrical shape, which at least partially forms the inner wall of the concrete body B to be produced. During the concrete pouring process, in the set-up state of the molding apparatus 1000 according to FIG. 1, concrete can be poured into the gap formed between the outer mold 200 and the mold core 300 in order to form the concrete body B to be produced (see, for example, FIGS. 2 and 3). By way of example, the molding apparatus 1000 is used to form substantially cylindrical concrete pipes in an upright position. The mold core 300 of the molding apparatus 1000 is exemplary embodied as a collapsible core, for example, which has an expansion device 400 (spreading and/or shrinking device) arranged in the exemplary hollow-cylindrical interior of the mold core 300 (see FIG. 2, not shown in FIGS. 1 and 3). The expansion device 400 extends, for example, in the interior of the mold core 300, in particular, for example, in the longitudinal direction of the mold core 300, i.e. in the present example vertically in the case of the mold core 300 standing as an example in FIG. 1. The longitudinal direction of the mold core is defined here, for example, by the longitudinal direction of the hollow and/or tubular concrete bodies or concrete pipes to be produced. The expansion device 400 is configured, for example, to spread (expand) the mold core 300 to form the set-up state for the concrete casting process and/or to shrink (contract) the mold core 300 to demould the concrete body B.

However, it should be pointed out that in the present example, substantially cylindrical concrete pipes can be cast in an upright position only by way of example. However, further examples are possible in which the outer shape and/or the inner shape, i.e. e.g. the inner mold core, of the molding apparatus deviate from the cylindrical shape and/or the substantially circular cross-section. For example, it is possible to produce concrete pipes with an oval cross-section or a square (triangular, square, pentagonal and with more corners) cross-section, if necessary with rounded corners, in which case the outer shape and/or the mold core in cross-section can be adapted to the desired shape of the produced concrete body is adjusted. Thus, examples with mold cores with an oval cross section or angular cross section, possibly with rounded corners, are also possible. Consequently, further examples with other inner and/or outer shapes can be provided, in which hollow and/or tubular concrete bodies can be produced, the outer and/or inner shape of which deviates from the circular shape in cross section, e.g. with oval, elliptical, angular (possibly with rounded corners) cross-sectional shapes outside and/or inside and/or with inside and/or outside shape centers deviating from the coaxial arrangement. Here, the cross-sectional shape of the inner wall of the outer mold and/or the cross-sectional shape of the outer wall of the mold core or the inner shape can deviate from the circular shape. Furthermore, it is possible to provide external and/or internal shapes whose cross-sectional shape and/or cross-sectional size may change in the longitudinal direction. In further examples, the outer mold 200 can, for example, comprise a cover element, possibly a circular and/or ring-shaped cover element, which covers the concrete body B hardening in the mold after the casting process from above, and/or a clamping device, which fastens the outer mold 200 and the inner mold and/or the mold core 300 in the set-up state for the casting process. In this example, the expansion device 400 is controlled hydraulically, for example, and/or can be actuated hydraulically, whereby in further examples, in addition to one or more hydraulic mechanisms, other mechanisms can also be used additionally or alternatively, e.g. using a mechanical, hydraulic, pneumatic and/or electrical and/or or electromagnetic control.

Figure 4:
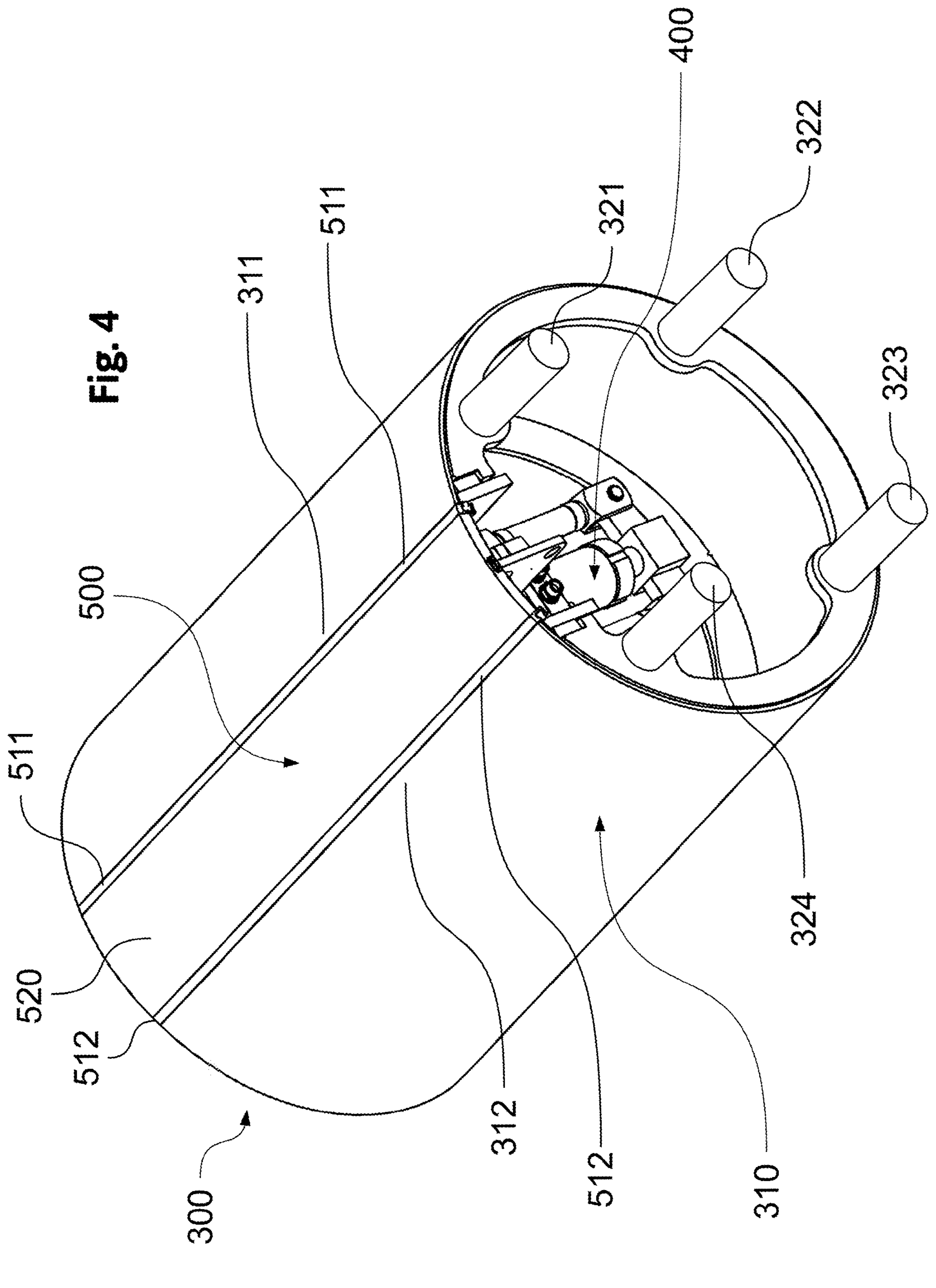
FIG. 4 shows an exemplary perspective view of a mold core of a molding apparatus for the production of tubular concrete bodies according to an exemplary embodiment of the present disclosure.

FIG. 4 shows an exemplary perspective view of a mold core 300 of a molding apparatus 1000 for producing hollow and/or in particular tubular concrete bodies according to an example of the present disclosure. By way of example, the mold core 300 in the molding apparatus 1000 according to FIGS. 1 to 3 can be used. Analogously to FIG. 2, the mold core 300 has the expansion device 400 on the inside, for example. The mold core 300 comprises, for example, a substantially cylindrical core mantle 310 (can also be referred to as a form mantle or wall of the core), which has a strip-shaped opening (longitudinal opening) that extends, for example, on one side in the longitudinal direction of the mold core 300, from one end to the other end of the mold core 300 and/or over the entire length of the mold core, on which opening, for example, a sealing and/or closing strip-shaped sealing element 500 is arranged. By way of example, the strip-shaped sealing element 500 extends (preferably at least) substantially from one end to the other end of the mold core 300, in particular in the longitudinal direction of the mold core, and/or by way of example (preferably at least) over the entire length of the mold core 300 along the longitudinal opening of the core mantle 310, especially in the longitudinal direction of the mold core. The strip-shaped sealing element 500 has on its longitudinal edges, for example, connecting strips 511 and 512 extending in the longitudinal direction, which connect the sealing element 500 to the respective longitudinal edges 311 and 312 of the strip-shaped longitudinal opening of the core mantle 310 and/or attach them sealingly. For example, FIG. 4 shows the mold core 300 in the spreaded and/or expanded state, in which the core mantle 310 is expanded, for example in such a way that the longitudinal edges 311 and 312 of the strip-shaped longitudinal opening of the core mantle 310 are pushed apart, in particular controlled and/or driven by, for example the expansion device 400. In FIG. 4, fastening elements 321 to 324 on the underside of the mold core 300 are shown merely by way of example, with which the mold core 300 can be fastened in a standing position on and/or at the stand section 100 of the molding apparatus 1000 between the outer mold sections 210 and 220 of the outer mold 200.

Figure 5:
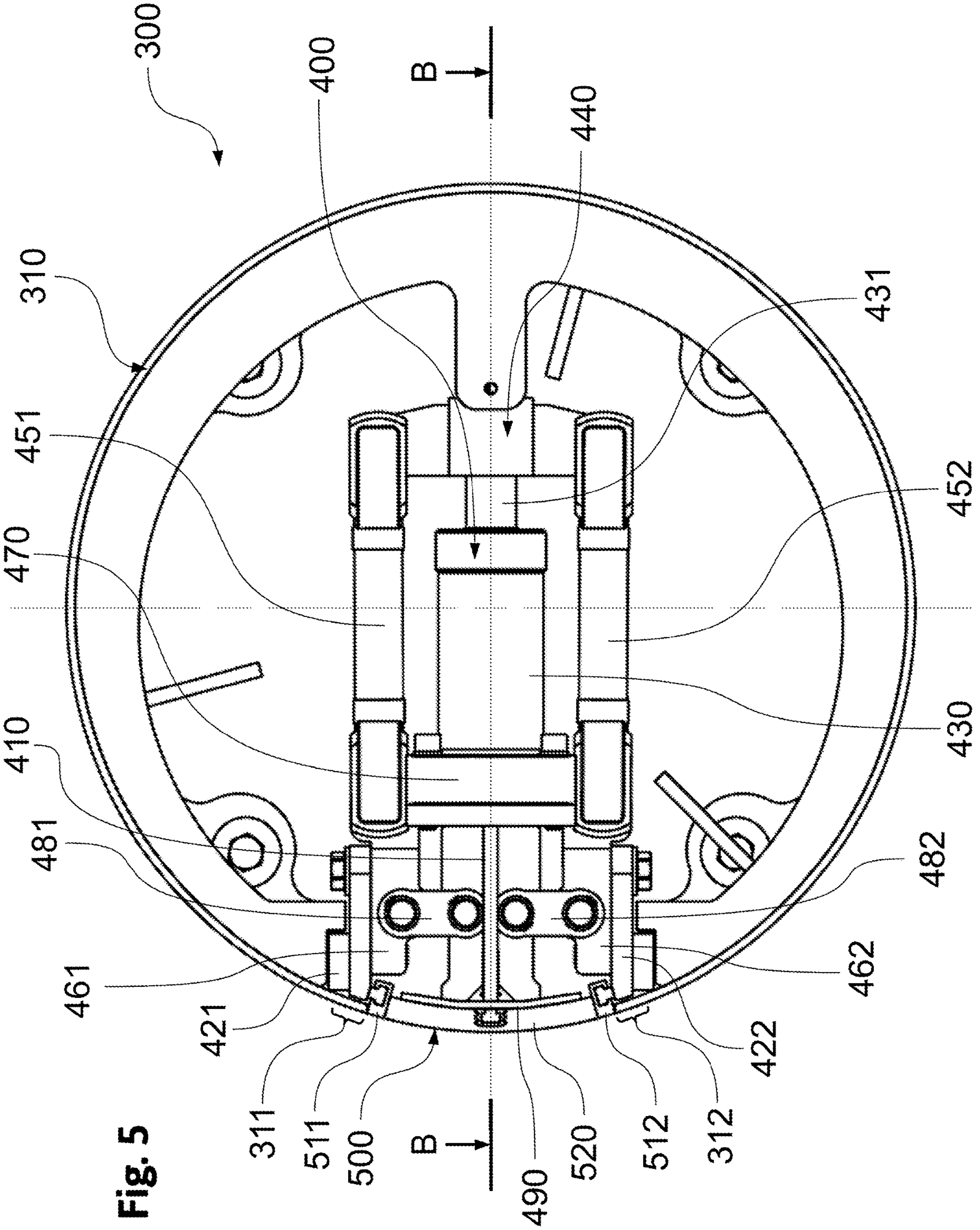
FIG. 5 shows an exemplary plan view of the exemplary mold core of FIG. 4.

FIG. 5 shows an exemplary plan view of the example of the mold core 300 according to FIG. 4. Here, in particular, the exemplary expansion device 400 arranged inside the mold core 300 is shown (e.g. analogously to FIG. 2). The expansion device 400 is operated hydraulically, for example, and is configured, for example, to spread and/or expand the mold core 300, e.g. by the longitudinal edges 311 and 312 of the core mantle 310 being pushed apart by an expansion mechanism of the expansion device 400, for example hydraulically controlled, or by expansion of the core mantle 310. Conversely, the expansion device 400 is configured, for example, to shrink and/or contract the mold core 300 in that the longitudinal edges 311 and 312 are moved towards one another and/or towards onto one another by the expansion mechanism of the expansion device 400, for example hydraulically controlled, or by contracting the core mantle 310. FIG. 5 shows, by way of example, the expanded and/or spread state of the mold core 300, with the longitudinal edges 312 and 312 of the strip-shaped longitudinal opening of the core mantle 310 being pushed apart, for example. The sealing element 500 is arranged between the longitudinal edges 311 and 312 of the longitudinal opening of the core mantle 310, for example, wherein the sealing element 500 seals the mold core 300 from the outside against the ingress of liquid, and, on the longitudinal sides of the sealing element 500, the connecting strips 511 and 512, for example, connect the sealing element 500 with the respective longitudinal edges 311 and 312 of the longitudinal opening of the core mantle 310 in a sealed manner. An exemplary expansion mechanism of the expansion device 400 and its exemplary mode of operation according to an example is shown in FIGS. 6 to 11 in more detail.

Figure 6:
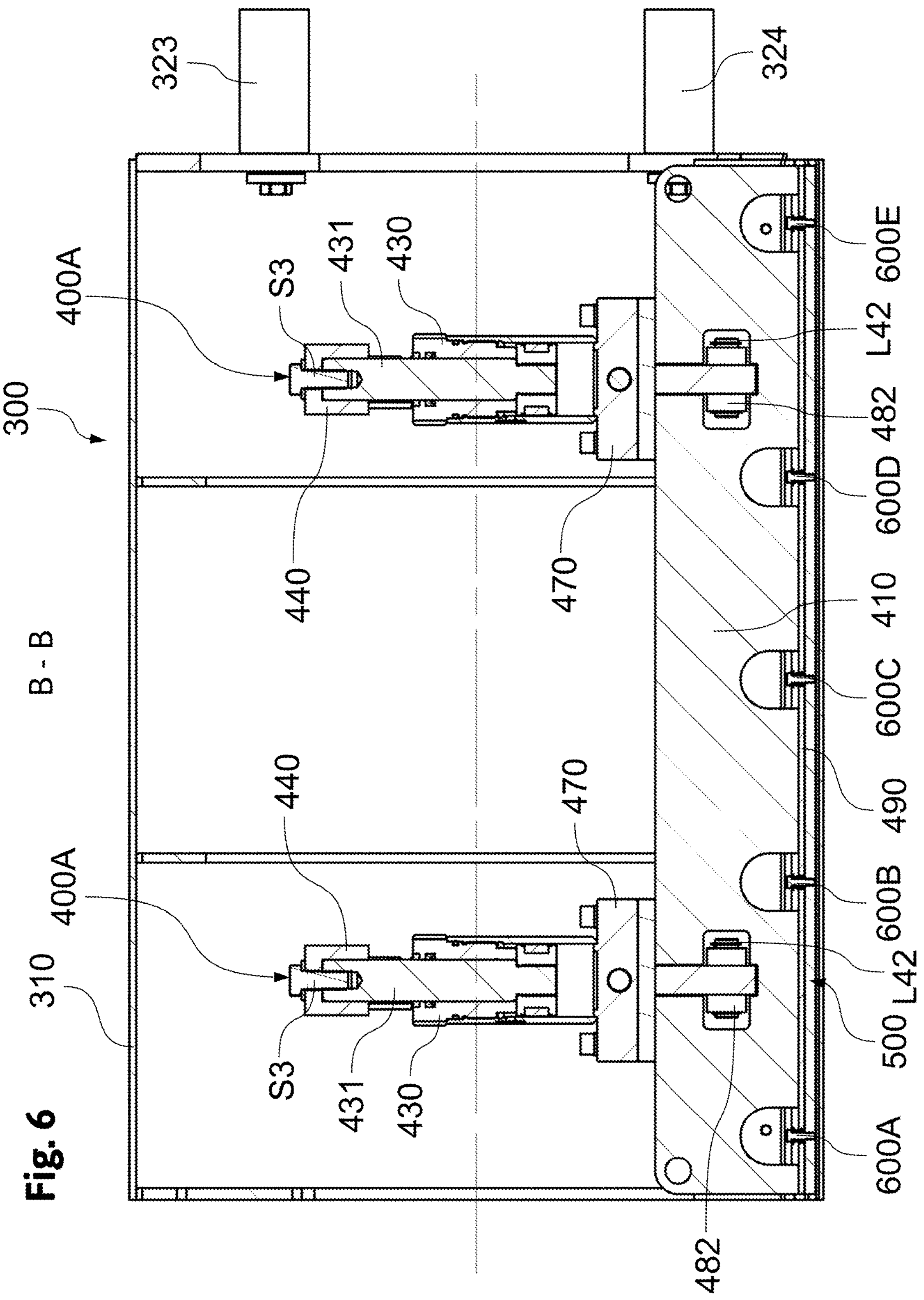
FIG. 6 shows an exemplary longitudinal sectional view of the exemplary mold core according to FIG. 3 (section B-B according to FIG. 5)

FIG. 6 shows an exemplary longitudinal cross-sectional view of the exemplary mold core 300 of FIG. 3 (section B-B of FIG. 5). FIG. 6 shows, by way of example, the expansion device 400 inside the mold core 300, the expansion device 400 extending, by way of example, in the longitudinal direction from one end of the mold core 300 to the other end. By way of example, the expansion device 400 comprises two hydraulically actuated expansion mechanisms 400A and 400B of exemplarily identical construction at different positions inside the mold core 300. In further examples, only one or more than two expansion mechanisms can also be provided, e.g. also depending on the length of the mold core. The expansion mechanisms 400A and 400B are each configured, for example, to move the sword element 410 of the expansion device 400, which extends for example in the longitudinal direction, in the radial direction of the substantially cylindrical core mantle 310, for example. The further exemplary mode of operation of the expansion device 400 and/or expansion mechanisms 400A and 400B is described in the following purely by way of example using an example.

Figure 7:
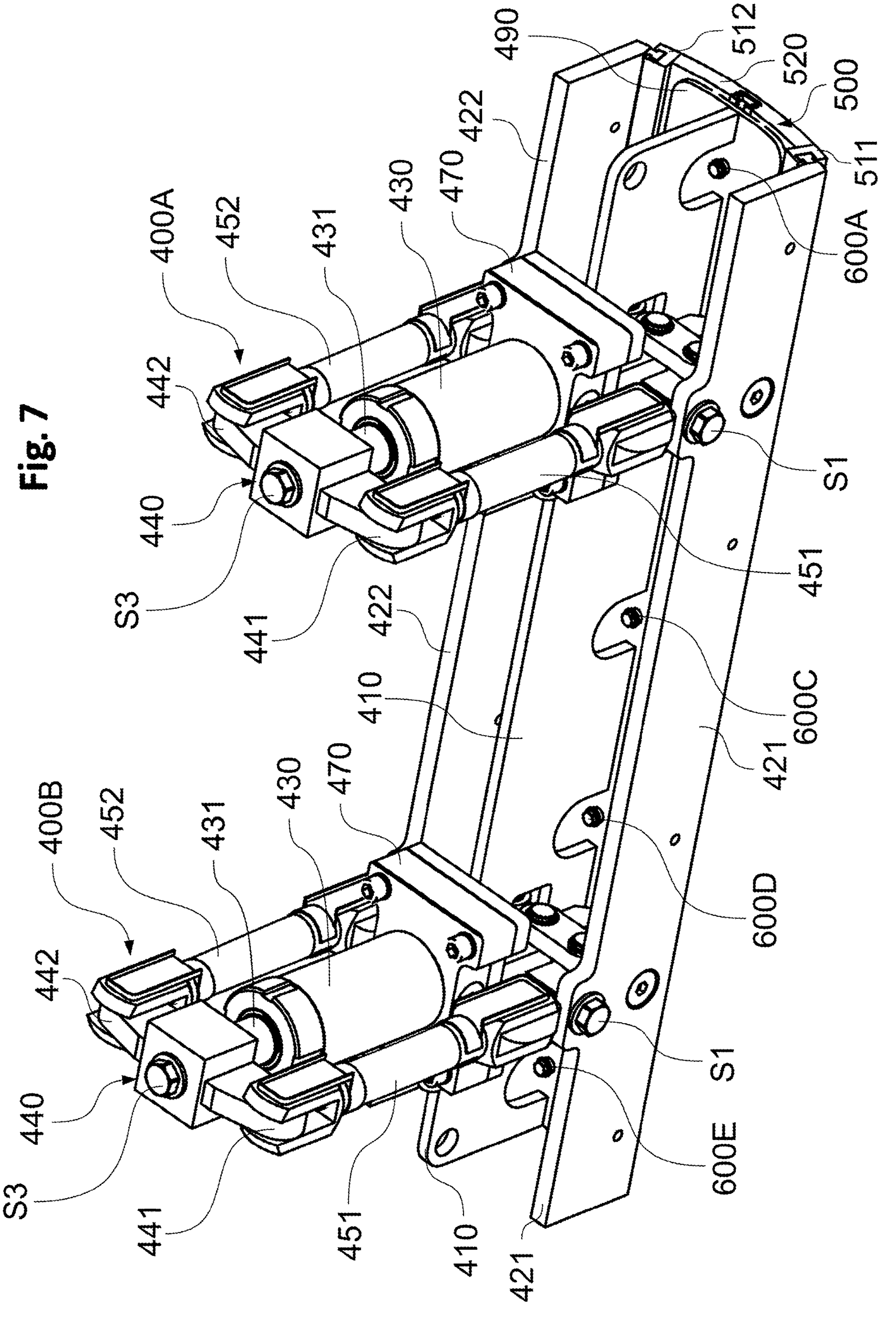
FIG. 7 shows an exemplary perspective view of an exemplary expansion device of a mold core of a molding apparatus for manufacturing tubular concrete bodies according to an exemplary embodiment of the present disclosure.

FIG. 7 shows an exemplary perspective view of an exemplary expansion device 400 of a mold core 300 of a molding apparatus 1000 for the production of hollow and/or in particular tubular concrete bodies according to an embodiment of the present disclosure. As previously described, by way of example, expansion device 400 includes two hydraulically actuable expansion mechanisms 400A and 400B. In further examples, only one or more than two expansion mechanisms can also be provided, e.g. also depending on the length of the mold core.

Figure 8:
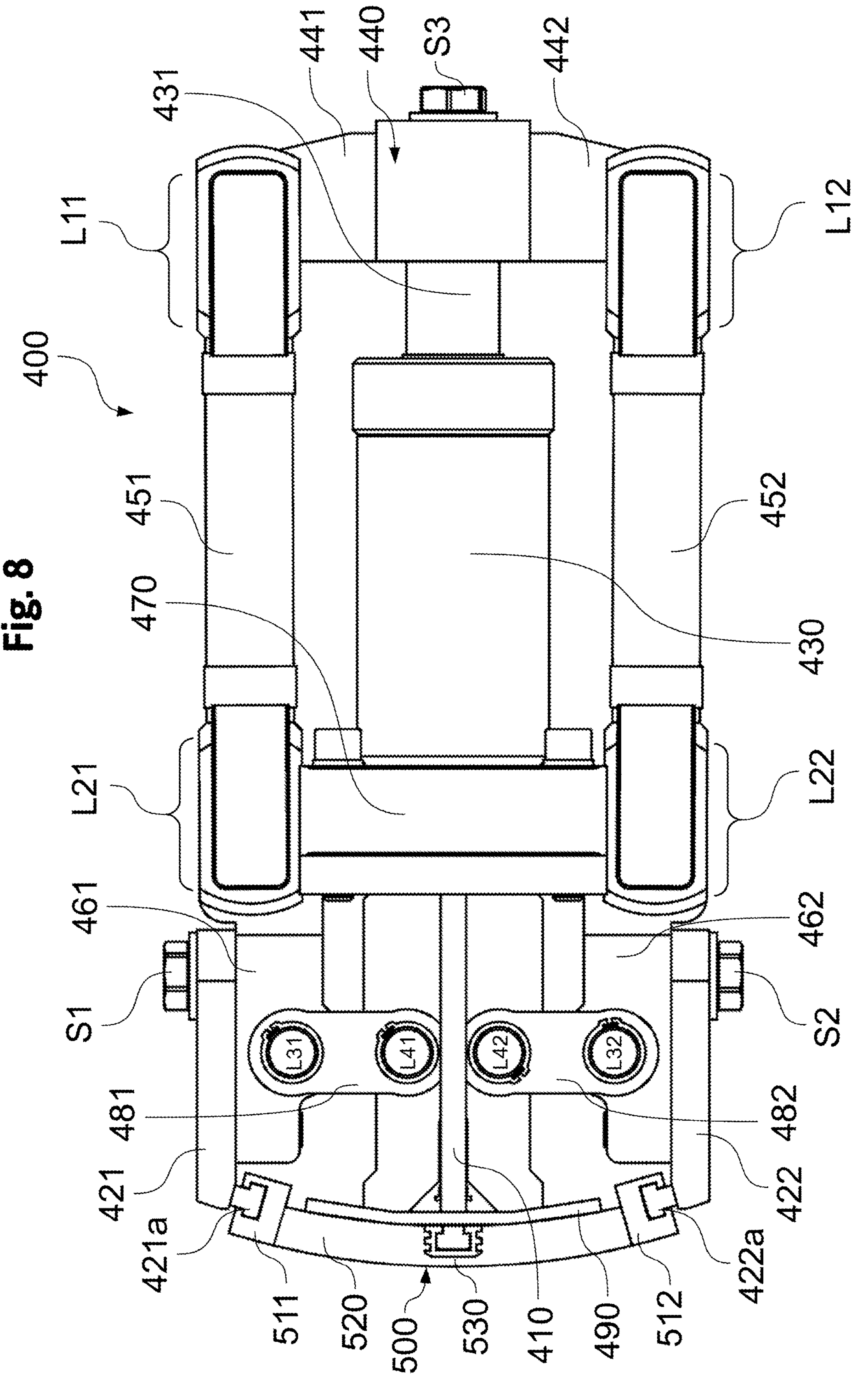
FIG. 8 shows an example front view of the example expansion device of FIG. 7.
Figure 9:
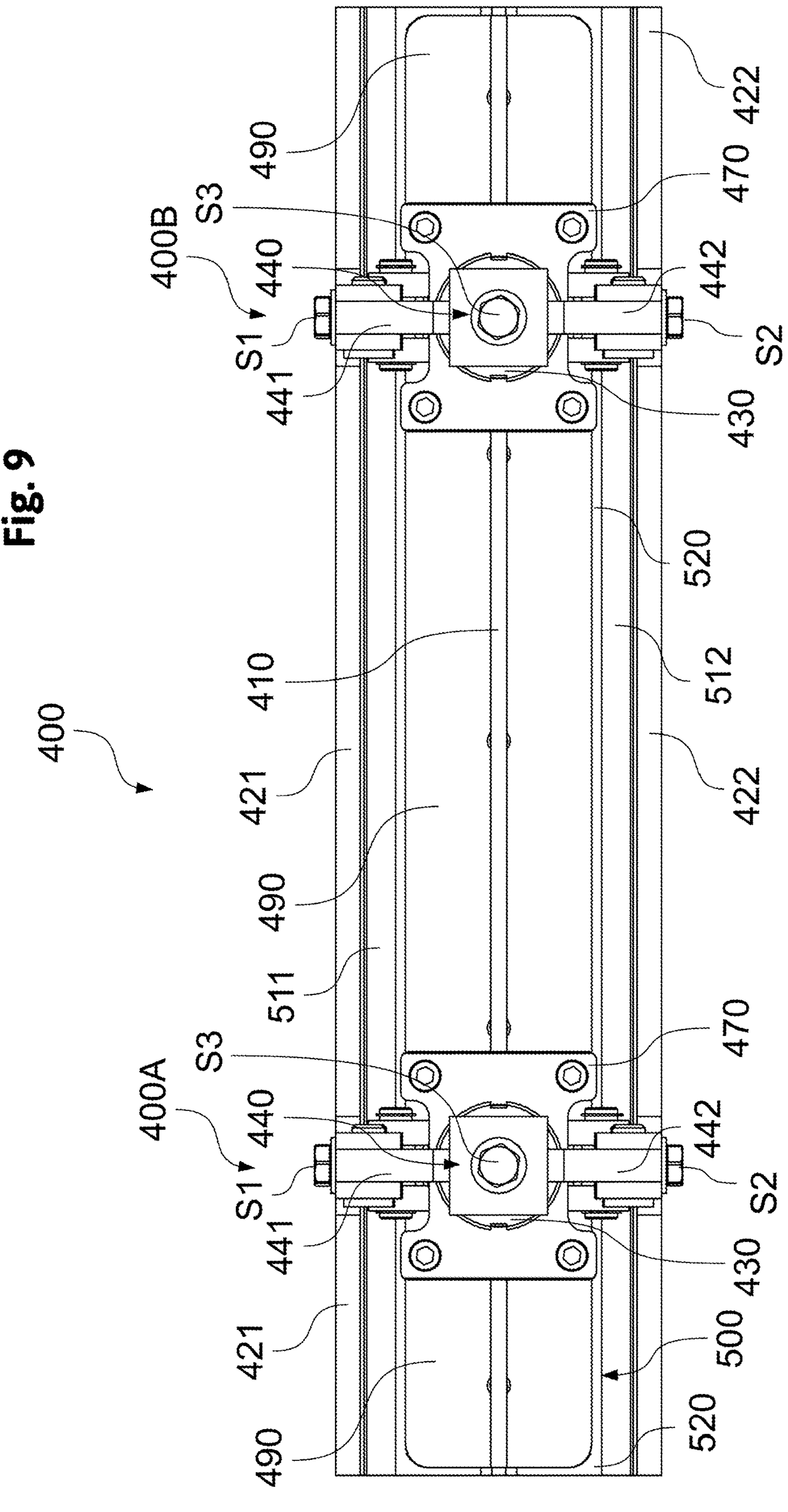
FIG. 9 shows an exemplary top view of the exemplary expansion device according to FIG. 7.
Figure 10:
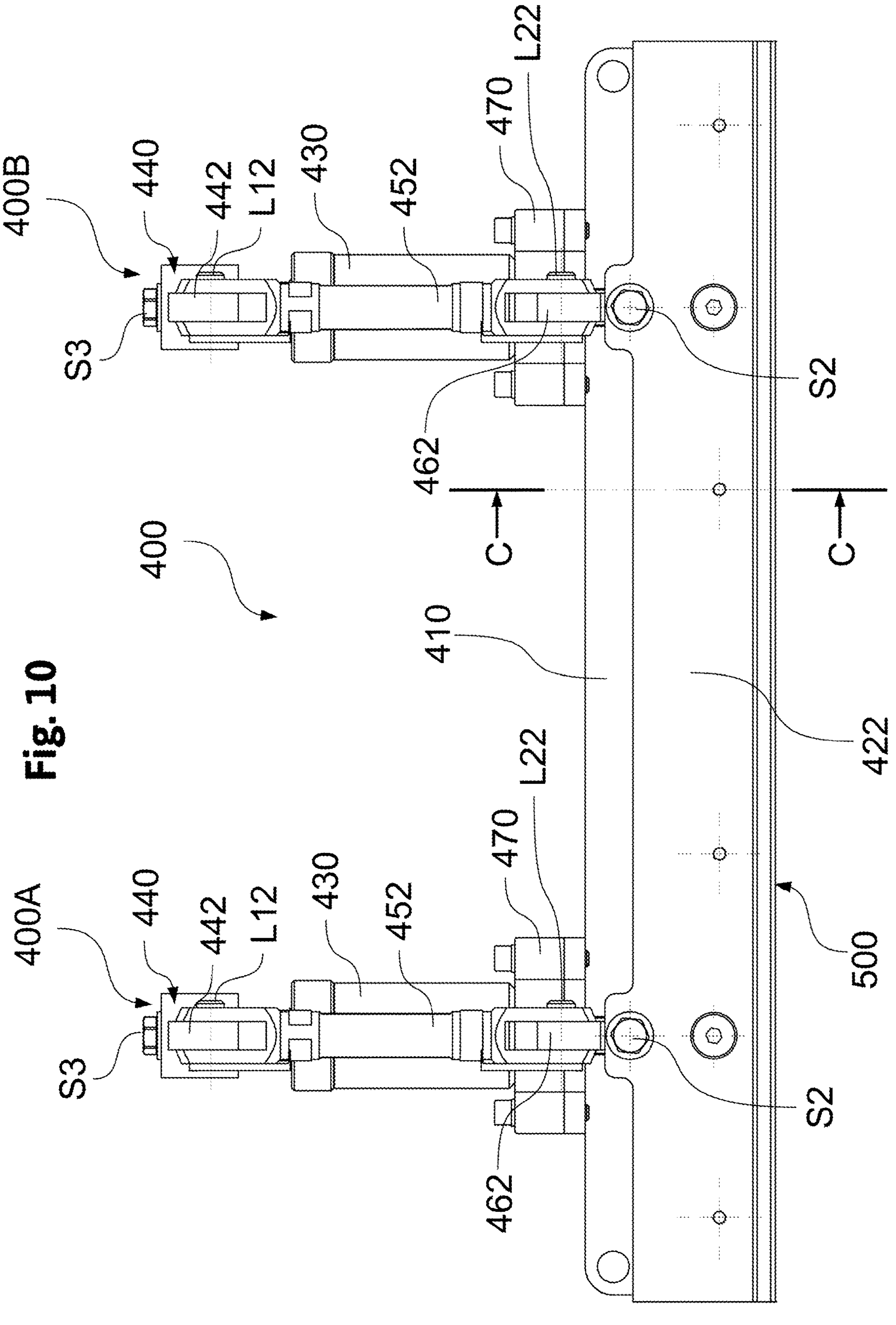
FIG. 10 shows an exemplary longitudinal side view of the exemplary expansion device of FIG. 7.

FIG. 8 shows an exemplary front view of the exemplary expansion device 400 according to FIG. 7, in particular, for example, in the spreaded and/or expanded state. FIG. 9 shows an exemplary top view of the exemplary expansion device 400 according to FIG. 7. FIG. 10 shows an exemplary longitudinal side view of the exemplary expansion device 400 according to FIG. 7. The expansion device 400 comprises, by way of example, two fastening strips 421 and 422 which extend parallel to one another in the longitudinal direction and which, for example, can be fastened and/or are fastened to the parallel extending longitudinal edges 311 and 312 of the strip-shaped longitudinal opening of the core mantle 310 in a parallel arrangement (see e.g. FIGS. 4 and 5). The expansion mechanisms 400A and 400B are each fastened and/or screw-connected to the fastening strips 421 and 422 on both sides in the longitudinal direction one behind the other, for example, via respective screw connections S1 and S2. The fastening strips 421 and 422 serve in the example only as an example as fasteners for fastening the expansion device 400 to the core mantle 310 or to the longitudinal edges 311 and 312 of the core mantle 310 and also only as an example for fastening or connecting the sealing element 500 or the connecting strips 511 and 512 of the sealing element 500 at/with the longitudinal edges 311 and 312 of the strip-shaped longitudinal opening of the core mantle 310 (see e.g. FIG. 5).

The expansion mechanism of expansion device 400 shown in FIG. 8 (and analogously, by way of example, expansion mechanisms 400A and 400B of exemplary identical construction) includes, for example, a hydraulic cylinder 430, the hydraulically controllable piston 431 of which, for example, has a lever element 440 that extends transversely to piston 431 and transversely to the longitudinal direction of expansion device 400 and is connected, in particular, for example, via a screw connection S3. On the side of hydraulic cylinder 430 facing away from lever element 440, the hydraulic cylinder 430 and/or a carrier element 470 carrying the hydraulic cylinder 430 is connected, for example, to the sword element 410 extending transversely to the axis of the hydraulic cylinder 430. At both end sections 441 and 442 of the lever element 440 and/or at both opposite sides of the lifting element 440, the push rod elements 451 and 452 are fastened, for example. For example, the push rod elements 451 and 452 are connected at both ends via swivel joints L11 and L12 and they can be rotatably mounted and/or pivotally mounted and/or rotatably held at the swivel joints L11 and L12 about a respective axis of rotation that is aligned substantially perpendicular to the push rod elements 451 and 451 and/or parallel to the longitudinal direction of the expansion device 400. The push rod elements 451 and 452 extend, for example, parallel to one another and parallel to the piston 431 of the hydraulic cylinder 430 and/or parallel to the axis of the hydraulic cylinder 430, which is aligned transversely to the longitudinal direction of the expansion device 400. For example, the push rod elements 451 and 452 are connected to the ends facing away from the lever element 440 and/or on the side facing away from the lever element 440 to respective fastening sections 461 and 462, wherein the fastening sections 461 and 462 are exemplarily respectively connected to the fastening strips 421 and 422 and/or or are fastened to them oppositely via the screw connections S1 and S2. Furthermore, by way of example, respective spacer elements 481 and 482 are fastened to the fastening sections 461 and 462 via pivot joints L31 and L32, the respective other ends of the spacer elements 481 and 482 being fastened to the sword element 410 on transversely opposite sides of the sword element 410 via respective pivot joints L41 and L42 to the sword element 410. For example, the spacer elements 481 and 482 are each mounted on the pivot joints L31, L32, L41 and L42 such that they can rotate and/or pivot and/or about a respective axis of rotation that is substantially perpendicular to the push rod elements 451 and 452 and/or parallel to the longitudinal direction of the expansion device 400. The spacer elements 481 and 482 are, for example, always aligned with their own longitudinal direction transverse to the longitudinal direction of the expansion device 400. It should be mentioned at this point that the longitudinal direction of the expansion device 400 in FIG. 8 is arranged, for example, perpendicular to the plane of the drawing. Here, the spacer elements 481 and 482 can be pivoted with respect to one another due to the rotatable mounting on the joints L31, L32, L41 and L42 and can also be pivoted relative to the connecting rods 451 and 452 at the same time.

In the exemplary spreaded position of expansion device 400 (spreaded and/or expanded state) shown in FIG. 8, the spacer elements 481 and 482 are, for example, aligned with their own longitudinal direction parallel and/or axially to one another and, for example, transversely to the push rods 451 and 452. Due to the alignment axially to one another, the joints L31 to L41 and/or L32 to L42 (and thus the joints L31 to L32) on both sides of the expansion mechanism 400 are at a maximum distance from one another. Thus, the opposing fastening sections 461 and 462 in the state shown in FIG. 7 are, for example, at a maximum distance from one another and the fastening strips 421 and 422 (and thus also the longitudinal edges 311 and 312 of the core mantle 310 fastened to them) are pushed apart at a maximum distance. This leads to the core mantle 310 being spreaded and/or expanded. In order to shrink and/or contract the mold core 300, e.g. for the demolding process, the hydraulic cylinder 430 can be actuated to retract the piston 431 so that the sword element 410 is moved towards the lever element 440, i.e. in particular in the inward direction relative to the mold core 300. This also leads to a movement of the sword element 410 relative to the fastening sections 461 and 462 and/or the fastening strips 421 and 422, so that the spacer elements 481 and 482 can be pivoted against each other and relative to the fastening sections 461 and 462 and the sword element 410. Due to the pivoting of the spacer elements 481 and 482, the distance between the attachment sections 461 and 462 is reduced compared to the spreaded position shown in FIG. 8, so that the attachment strips 421 and 422 connected to the attachment sections 461 and 462 and/or the longitudinal edges 311 and 312 attached thereto of the core mantle 310 are contracted and the distance between the longitudinal edges 311 and 312 of the core mantle 310 is reduced over the entire length of the core mantle 310. This leads to the desired shrinkage of the mold core 300 in order to facilitate demoulding of the concrete body B.

FIG. 8 also shows the fastening of the exemplary sealing element 500 by way of example. The sealing element 500 is fastened to the respective fastening strips 421 and 422 by connection of the connecting strips 511 and 512 of the sealing element 500 and/or is connected to them in a sealing manner. The fastening strips 421 and 422 serve in the example only as an example as fasteners for fastening the expansion device 400 to the core mantle 310 or to the longitudinal edges 311 and 312 of the core mantle 310 and also only as an example for fastening or connecting the sealing element 500 or the connecting strips 511 and 512 of the sealing element 500 at/with the longitudinal edges 311 and 312 of the strip-shaped longitudinal opening of the core mantle 310 (see e.g. FIG. 5). In particular, the profiles of the connecting strips 511 and 512 of the sealing element 500 have, for example, longitudinally running groove sections 511*a* and 512*a* which, for example, have a T-shape in cross-sectional profile (see e.g. also FIGS. 12A to 12D). The fastening strips 421 and 422 have, for example, corresponding profile rails 421*a* and 422*a* extending in the longitudinal direction, which are designed to engage in the respective groove sections 511*a* and 512*a* of the connecting strips 511 and 512 of the sealing element 500 and/or to be slided in into them in the longitudinal direction, so that the profile rails 421*a* and 422*a*, which have a T-shape, for example, are fastened to the groove sections 511*a* and 512*a* and/or to the connecting strips 511 and 512 of the sealing element 500 and/or are connected to them in a sealing manner. The connecting strips 511 and 512 of the sealing element 500 as well as the profile rails 421*a* and 422*a* of the fastening strips 421 and 422 extend, for example, in the longitudinal direction parallel to the longitudinal edges 311 and 312 of the core mantle 310 and can preferably be displaced in relation to one another in the longitudinal direction, but they are preferably positively connected in the transverse direction and/or transversely to the longitudinal direction. In particular, the connecting strips 511 and 512 of the sealing element 500 are each connected to the fastening strips 421 and 422 so that they can be slidably displaced in the longitudinal direction, for example, with the movement transverse to the longitudinal direction being blocked in a form-fitting manner (i.e. for example only one remaining degree of translatory freedom). This has the advantage that the sealing element 500 can be replaced easily and inexpensively, e.g. when signs of wear occur, by the sealing element 500 being held on the fastening strips 421 and 422 so that it can be pulled out in the longitudinal direction. For example, the sealing element 500 can advantageously simply be slidably pulled out of the longitudinal opening of the core mantle 310 in the longitudinal direction and a sealing element 500 of the same construction and/or a sealing element having analogous connecting strips 511 and 512 can be slidably inserted in the longitudinal direction.

The sealing element 500 is configured, for example, to seal off the interior of the mold core 300 during the concrete pouring process and to prevent liquid from penetrating into the interior of the mold core 300. For this purpose, the sealing element 500 has, for example, a connecting band 520 which is arranged between the connecting strips 511 and 512 and is connected to the connecting strips 511 and 512, which connecting band 520 is, for example, flexible and/or preferably elastically bendable (particularly preferably bendable or deformable about a longitudinal axis of the sealing element 500). For example, the connecting band 520 can consist of an elastically bendable or elastically formable material, such as an elastic plastic, and/or can comprise a section consisting of an elastically bendable material, such as an elastic plastic. In preferred examples, the connecting band 520 comprises an elastomer and/or the connecting band 520 consists of an elastomer.

In the expanded state shown as an example in FIG. 8, the round shape of the elastic connecting band 520 (see, e.g. also FIG. 5) is specified, for example, by a shaped plate 490 (shaped plate), with the shaped plate 490 being attached (in particular on the side facing away from the lever element 440 and/or from the hydraulic cylinder 430) to the sword element 410 (see e.g. also FIG. 6). When the sword element 410 is pulled inwards during the shrinking of the mold core 300 by the expansion device 400, the shaped sheet metal 490 also lifts off of the elastic connecting band 520 of the sealing element 500 and is pulled inwards, for example. In addition (as described further above by way of example), the longitudinal edges 311 and 312 of the wall of the core 310 are pushed towards each other, for example, so that the connecting strips 511 and 512 of the sealing element 500 are also pushed towards each other, for example. When the mold core 300 shrinks, this also leads, for example, to a bending of the elastic connecting band 520 of the sealing element 500 folding inwards. The outward bending of the elastic connecting band 520 of the sealing element 500 is prevented in this process (e.g. when demoulding a hardened concrete body) by the inner surface of the hardened concrete body B lying against the sealing element 500 on the outside. This results in the technical advantage that the sealing element 500 and/or the flexibly and/or elastically bendable connecting band 520 of the sealing element 500 is not initially pulled inwards, but rather is bent inwards, with the advantageous avoidance of tensile forces acting on the connecting band 520, by the pushing together of the longitudinal edges 311 and 312 of the core mantle 310. Due to the avoidance of tensile forces acting on the sealing element 500, this advantageously leads to less stress acting on the sealing element 500 and/or the flexibly and/or elastically bendable connecting band 520 of the sealing element 500 and thus to an improvement in the wear behavior and/or to the advantageous avoidance of above-average signs of wear on the sealing element 500 and/or on the connecting band 520 of the sealing element 500. Should the sealing element 500 nevertheless be worn out after repeated use and/or after a large number of casting processes and/or shrinkage processes, e.g. due to cracking, it can still quickly, efficiently, inexpensively and easily replaced according to the above description. Overall, there is a significant improvement in the service life of the molding apparatus 1000 due to the reduced wear of the sealing element 500 on the one hand and the simpler and/or quicker possibility of replacing the sealing element 500 on the other.

Figure 11:
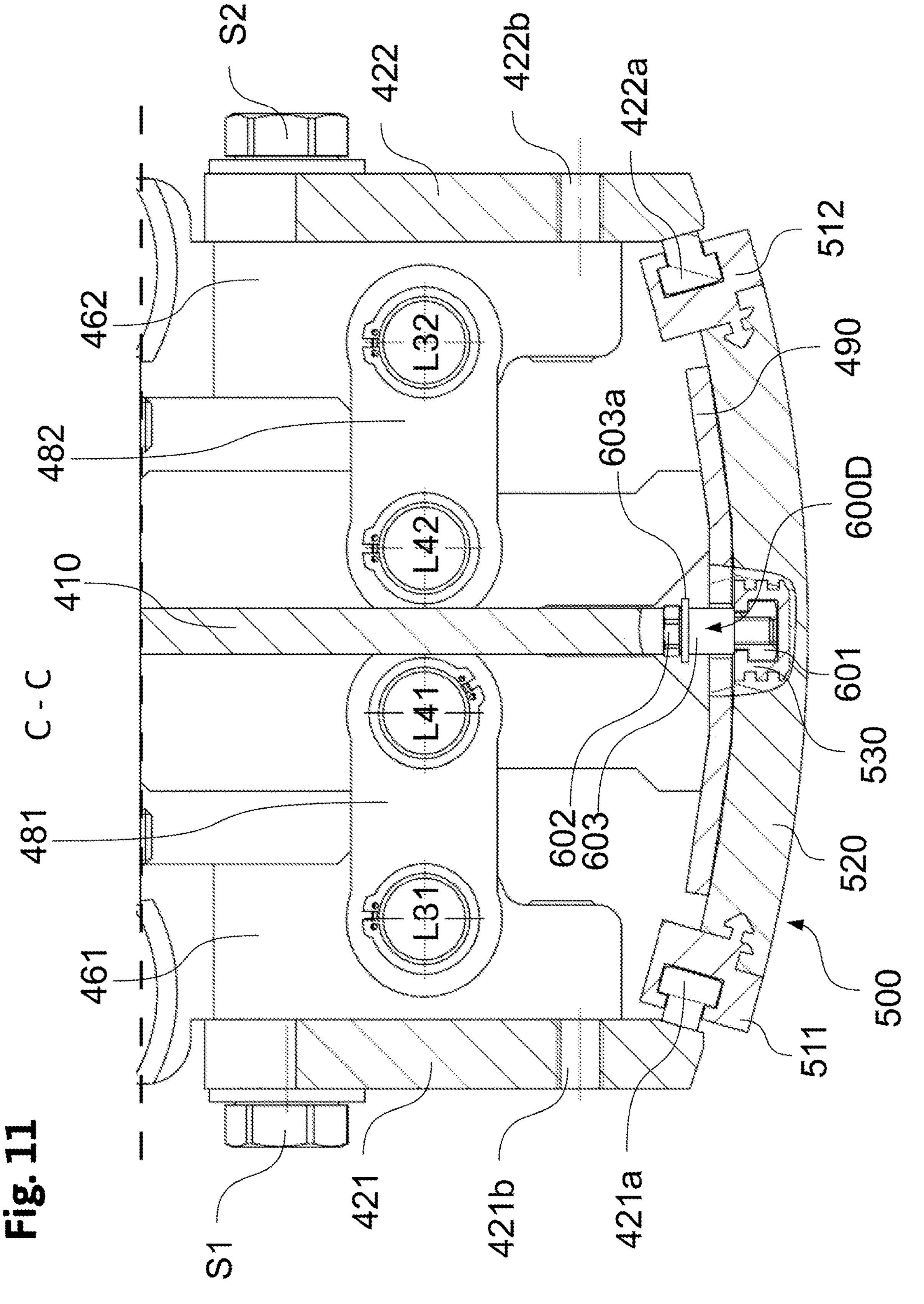
FIG. 11 shows an exemplary cross-sectional view of the exemplary expansion device of FIG. 7 (section C-C of FIG. 10)

FIG. 11 shows an example cross-sectional view of the example expansion device 400 of FIG. 7 (section C-C of FIG. 10). The illustration is analogous to FIG. 8 by the plan view of the expansion mechanism 400B. However, as an example, bores 421*b* and 422*b* are also shown on the fastening strips 421 and 422, to which the fastening strips 421 and 422 (and thus the expansion device 400) can be fastened to fastening strips on the longitudinal edges 311 and 312 of the core mantle 310. Additionally, an example guide member 600D is shown in FIG. 11. Such guide elements 600A to 600E are, for example, held one behind the other at several positions in the center of the guide plate 490 in the longitudinal direction (see also FIGS. 6 and 7), in particular at the respective bores in the shaped plate 490 (see FIG. 11). The guide element 600D has, for example, on the side of the shaped sheet metal 490 facing the sealing element 500, a stamping section 601 which is fastened, for example, with a screw 602 extending through the respective bore of the shaped sheet metal 490. For example, the screw 602 extends further through a spacer sleeve 603, which also extends through the respective bore of the shaped sheet 490, wherein the spacer sleeve 603 has, on the side of the shaped sheet 490 facing away from the sealing element 500, for example, a driver section 603*a* with an enlarged diameter. The sealing element 500 has, for example, on the side facing the interior of the mold core 300, for example, a profile strip 530 extending in the longitudinal direction in the middle, which is fastened, for example, to the connecting band 520 of the sealing element 500. The profile strip 530 has, for example, a receiving groove 530*a*, which is opened inwards toward the interior of the mold core, for the stamping sections 610 of the guide elements 600A to 600E (see also FIG. 12). The receiving groove 530*a* of the profile strip 530 has, for example, a T-shape in cross-sectional profile (see also FIG. 12, for example), which is adapted, for example, to the cross-sectional profile of the stamping section 601 of the guide elements 600A to 600E. In the process of shrinking the mold core 300, when the sword element 410 and thus also the shaped sheet 490 are pulled radially into the interior of the mold core 300, the shaped sheet 490 moves inwards and lifts off the connecting band 520 of the sealing element 500. Here, the shaped sheet 490 moves a preset stroke distance inwards (upward in FIG. 10), for example, which is preset with the length of the spacer sleeve 603 and/or the screw length of the screw 602, until the upper side of the shaped sheet 490 comes into contact with the driver section 603*a* of the spacer sleeve 603 and takes the spacer sleeve 603 and/or the driver section 603*a* of the spacer sleeve 603 with it, so that, after the movement of the exemplary preset stroke distance (without tensile forces acting on the sealing element 500), the guide elements 600A to 600E carried along by the shaped sheet metal 490 via the stamp sections 601 inserted in the profile strip 530, thereby guiding the sealing element 500 and/or its inward bending during the shrinking process.

According to the above examples, the expansion device is configured, for example, to carry out the shrinking process in two steps and/or as two-staged shrinking, in particular with preferably a single continuous lifting movement of the mechanism driving both shrinking steps, herein for example by the hydraulic cylinder 430. For example, in the first step (e.g. first stage of the continuous shrinking process), the sword element 410 and thus also the shaped sheet metal 490 are pulled radially into the interior of the mold core 300, with the shaped sheet metal 490 moving inwards and being lifted off of the connecting band 520 of the sealing element 500, for example without tensile force in this first step being exerted on the sealing member 500. If the continuous lifting movement is continued by the single and/or the same drive (e.g. the hydraulic cylinders), the upper side of the shaped sheet metal 490 comes into contact with the driver section 603*a* of the spacer sleeve 603 (transition to the second step and/or to the second stage of the continuous shrinking process), for example, and the shaped sheet metal 490 then, for example, takes the spacer sleeve 603 and/or the driver section 603*a* of the spacer sleeve 603 with it in the second step, so that in the second step, for example, the sealing element 500 is now also carried along during the shrinking movement of the mold core 300 driven by the same drive mechanism. As a result, this example has the technical advantage that the sealing element 500 and/or the flexible and/or elastically bendable connecting band 520 of the sealing element 500 is not initially pulled inwards, but rather is bent inward, with the advantageous avoidance of tensile forces acting on the connecting band 520, due to the pushing together of the longitudinal edges 311 and 312 of the core mantel 310, wherein the bending of the sealing element 500 also is advantageously guided, for example, by the guide elements 600A to 600E and being held in the shrunken state.

Due to the avoidance of tensile forces acting on the sealing element 500, despite the advantageous guidance by the guide elements 600A to 600E, there is advantageously less stress on the sealing element 500 and/or the flexibly and/or elastically bendable connecting band 520 of the sealing element 500, and thus an improvement in the wear behavior and/or an advantageous avoidance of above-average wear and tear on the sealing element 500 and/or on the connecting band 520 of the sealing element 500 is achieved. Should the sealing element 500 nevertheless wear out after repeated use and/or after a large number of casting processes and/or shrinkage processes, e.g. due to cracking, it can still be replaced quickly, efficiently, inexpensively and easily according to the above description, wherein in this case, the stamp sections 601 of the guide elements 600A to 600E are also pushed in into the receiving groove 530*a* of the profile strip 530 (guide strip) of the sealing element 500 when the sealing element 500 is pushed in in the axial direction. Overall, there is a significant improvement in the service life of the forming device 1000 due to the lower wear of the sealing element 500 on the one hand and the simpler and/or faster possibility of replacing the sealing element 500 with simultaneous excellent guidance of the bending process on the other.

Figure 12A:
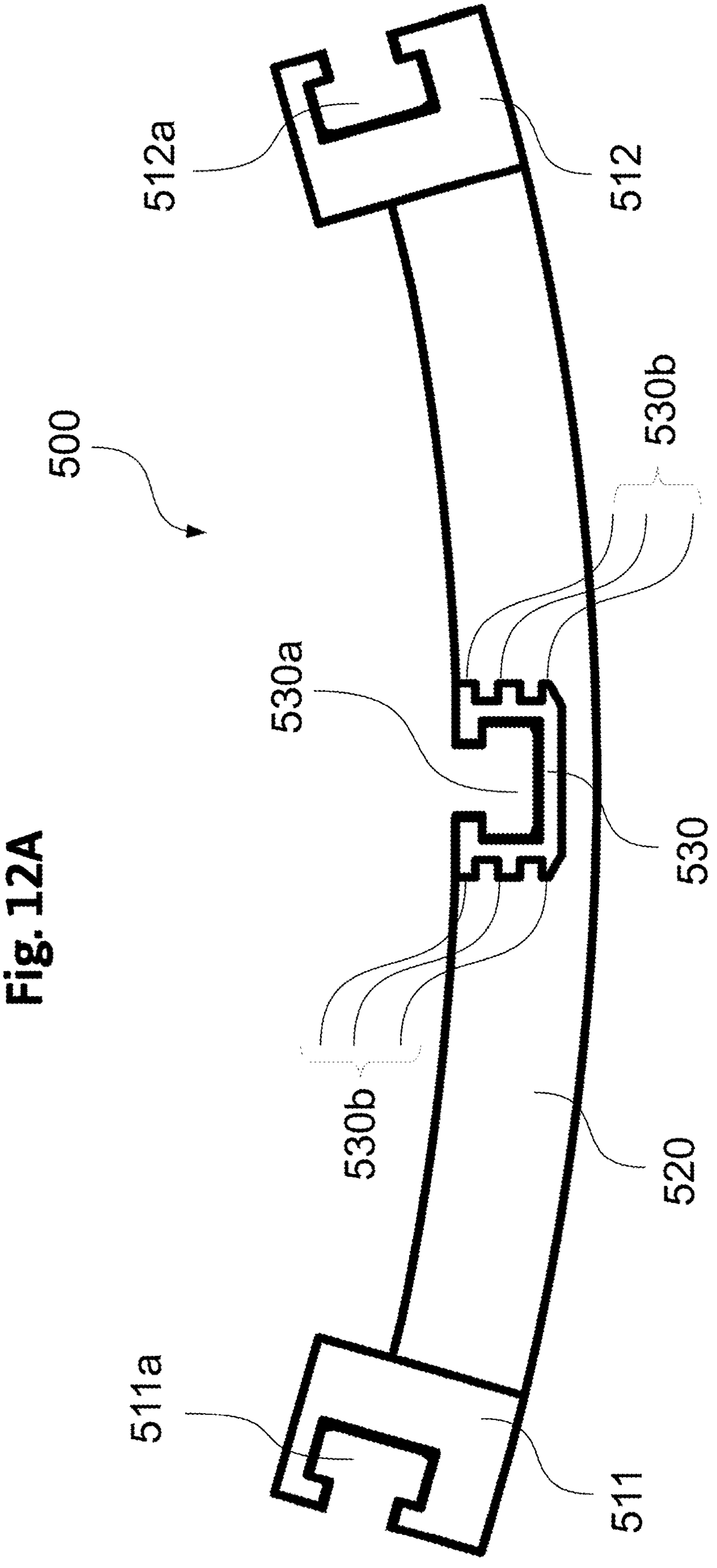
FIG. 12A shows an exemplary profile view of a sealing element for use on a mold core according to an exemplary embodiment of the present disclosure.

FIG. 12A shows an exemplary profile view of a sealing member 500 for use on a mold core 300 according to an exemplary embodiment of the present disclosure. The sealing element 500 is preferably in the form of a strip, with the longitudinal edges of strip-shaped sealing element 500 being provided, for example, with connecting strips 511 and 512, which are arranged opposite one another on the flexibly and/or elastically bendable (preferably strip-shaped) connecting band 520 arranged between connecting strips 511 and 512 of the sealing element 500, e.g. by an adhesive connection or at least supported by an adhesive connection. By way of example, the connecting strips 511 and 512 have the receiving grooves 511*a* and 512*a*, which are open laterally to the outside, for receiving the rail profiles 421*a* and 422*a* of the fastening strips 421 and 422 for sealing attachment to the mold core 300 and/or the core mantle 310. The receiving grooves 511*a* and 512*a* have, for example, a T-shape in the cross-sectional profile. In the middle, the sealing element 500 also has, for example, a profile strip 530 extending in the longitudinal direction, which is fastened to the connecting band 520 of the sealing element 500, for example. The profile strip 530 has, for example, an outwardly open receiving groove 530*a* for receiving the above-described stamping sections 610 of the guide elements 600A to 600E.

For example, the profile strip 530 is embedded in the connecting band 520 of the sealing element 500 in such a way that the outside of the profile strip 530 terminates with the outside of the connecting band 520 of the sealing element 500 and does not and/or does not substantially protrude beyond it. Here, the profile strip 530 can be connected to the connecting band 520 of the sealing element 500 by a non-positive connection (e.g. an adhesive connection) or at least supported by a non-positive connection. In addition, the profile strip 530 has, for example, laterally protruding profile webs 530*b* in order to strengthen the connection between the profile strip 530 and the connecting band 520 and to avoid and/or prevent the connection from tearing off during repeated bending movements of the connecting band 520. To strengthen the connection of the connecting band 520 to the connecting strips 511 and 512 and in particular to reduce the risk of tearing off in the edge area of the connecting band 520, the connecting strips 511 and 512 can also have profile sections protruding into the material of the connecting band 520 (possibly similar to the profile webs 530*b* of the profile strip 530). This improves the longevity of the connection of the connecting band 520 to the connecting strips 511 and 512 over the entire length of the sealing element 500 and thus avoids partial tearing off at the edges even if the sealing element 500 is used multiple times in shrinking and/or expansion processes on the mold core 300.

Figure 12B:
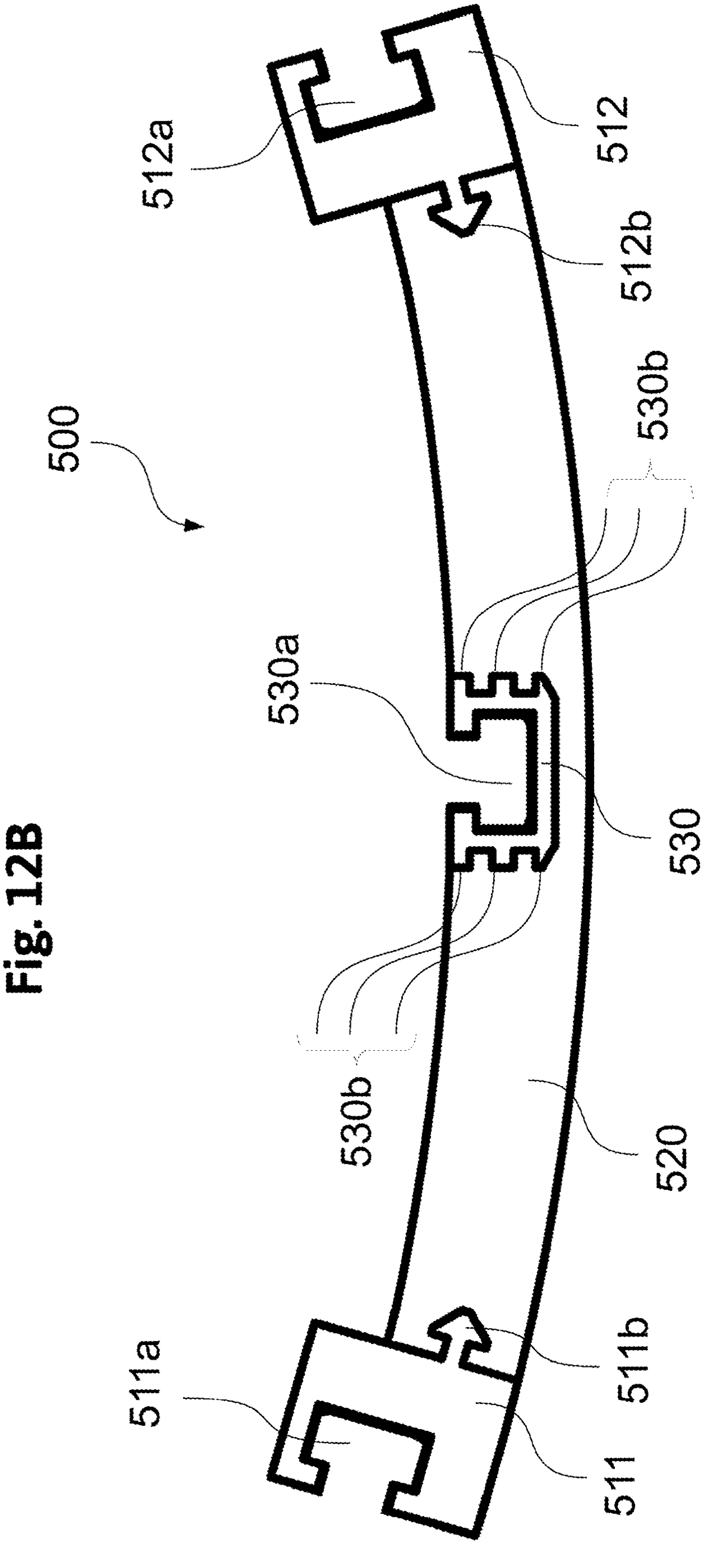
FIG. 12B shows an exemplary profile view of a sealing element for use on a mold core according to another exemplary embodiment of the present disclosure.

FIG. 12B shows an exemplary profile view of a sealing member 500 for use on a mold core 300 according to another exemplary embodiment of the present disclosure. The features from FIG. 12A are taken up here by way of example. To strengthen the connection of the connecting band 520 to the connecting strips 511 and 512 and in particular to reduce the risk of tearing off in the edge area of the connecting band 520, the connecting strips 511 and 512 have, for example, respective anchor profile sections 511*b* and 512*b* protruding into the material of the connecting band 520. This improves the longevity of the connection of the connecting band 520 to the connecting strips 511 and 512 over the entire length of the sealing element 500 and thus avoids partial tearing off at the edges even if the sealing element 500 is used multiple times in shrinking and/or expansion processes on the mold core 300

Figure 12C:
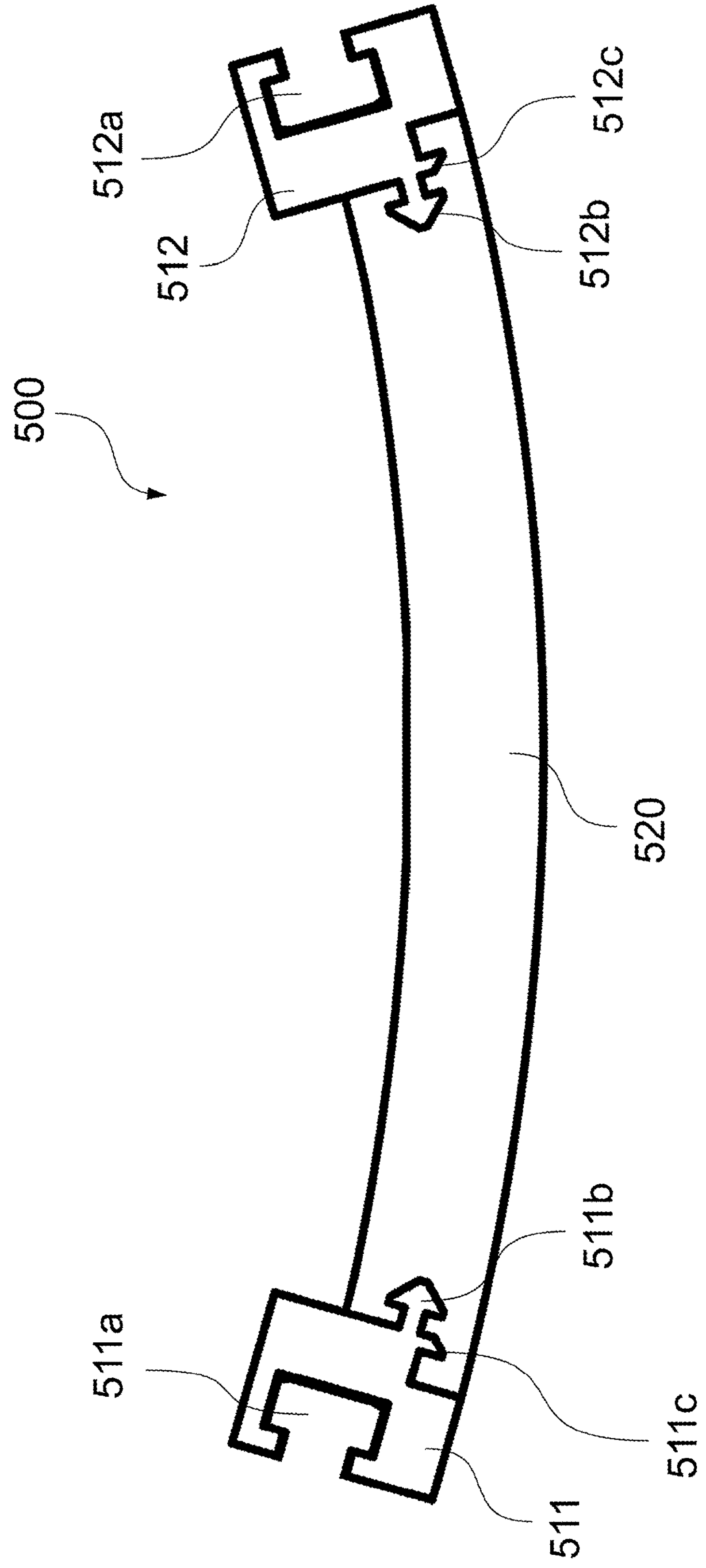
FIG. 12C shows an exemplary profile view of a sealing element for use on a mold core according to another exemplary embodiment of the present disclosure.

FIG. 12C shows an exemplary profile view of a sealing element 500 for use on a mold core 300 according to another exemplary embodiment of the present disclosure. The features from FIG. 12B are taken up here by way of example, the profile strip 530 being dispensed with by way of example (elements 600A to 600E can then be omitted in the expansion device). To strengthen the connection of the connecting band 520 to the connecting strips 511 and 512 and in particular to reduce the risk of tearing off in the edge area of the connecting web band 520, the connecting strips 511 and 512 again have, for example, respective anchor profile sections 511*b* and 512*b* protruding into the material of the connecting band 520. In addition, the connecting strips 511 and 512 have, for example, respective nose profile sections 511*c* and 512*c* protruding into the material of the connecting band 520, which protrude transversely to the anchor profile sections 511*b* and 512*b* into the material of the connecting band 520, for example. This improves the longevity of the connection of the connecting band 520 with the connecting strips 511 and 512 over the entire length of the sealing element 500 even more and thus leads to an improved avoidance of partial tearing off at the edges, even if the sealing element 500 is used several times in shrinking and/or expansion processes on the mold core 300.

Figure 12D:
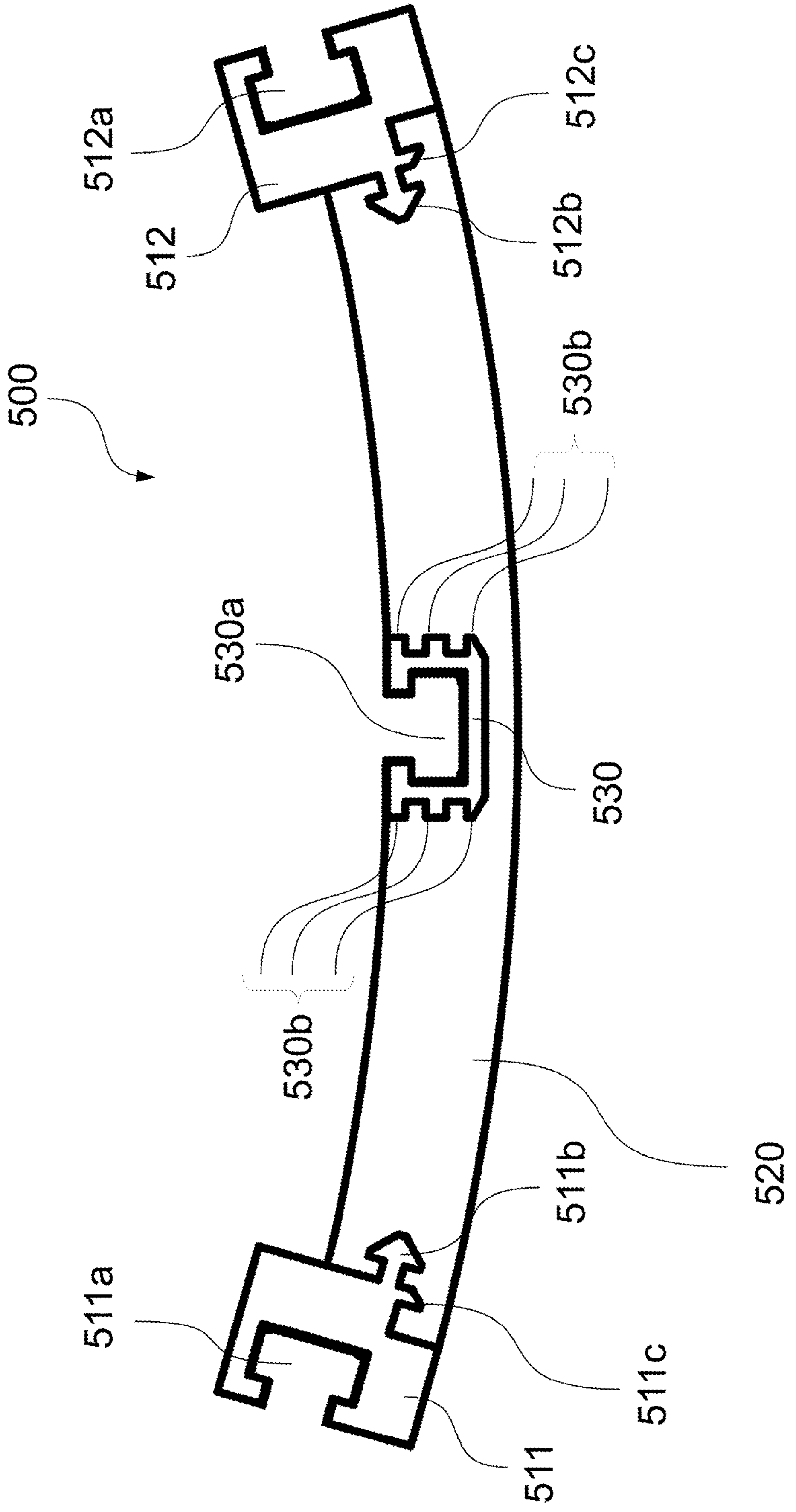
FIG. 12D shows an exemplary profile view of a sealing member for use on a mold core according to another exemplary embodiment of the present disclosure.

FIG. 12D shows an exemplary profile view of a sealing member 500 for use on a mold core 300 according to another exemplary embodiment of the present disclosure. The features from FIG. 12C are taken up here by way of example, the profile strip 530 being provided analogously to FIG. 12A by way of example.

In examples, the sealing elements are preferably designed such that their cross-sectional width is substantially at least four times, in particular at least five times greater than the cross-sectional height of the connecting band, particularly preferably at least eight times greater than the cross-sectional height of the connecting band. In the above examples, the cross-sectional width is substantially ten times greater than the cross-sectional height of the connecting band.

In the above examples, an expansion device 400 and a sealing element 500 were shown on the mold core 300 in each case. However, in further examples it is also possible to provide a mold core with a core mantle (wall of the core) with a plurality of longitudinal openings and a plurality of sealing elements sealing the respective longitudinal openings. For example, in the case of an oval shroud shape, both opposite sides of the shroud can be provided with a respective expansion device and/or a respective sealing element. In the case of angular core mantle cross-sections (triangular, square, pentagonal, . . . , polygonal; e.g. with rounded corners), several and/or all sides between two corners of the wall of the core cross-section can be provided with appropriate expansion devices and/or sealing elements. Examples of the present disclosure have been described and proposed above, so that with regard to the disadvantages of the known prior art, mold cores according to the disclosure for molding apparatuses for the production of hollow and/or in particular tubular concrete bodies and accessories and spare parts (e.g. the sealing elements described) for such mold cores can be proposed and/or provided, in which a cost-effective arrangement that reliably seals the core mantle inwards can be provided, which also enables improved service life, is able to reduce material fatigue and/or wear and/or allow for easier handling in the event of material fatigue and/or wear and tear. It should be pointed out again that only examples and/or examples of the present disclosure and their advantages have been described in detail above with reference to the attached figures. It should be emphasized again that the present disclosure is in no way limited and/or limited to the above-described embodiments and their embodiment features and/or their described combinations, but also includes modifications of the embodiments, in particular those that are made possible by modifications of the features of described examples and/or by combination and/or partial combination of one or more of the features of the described examples are included within the scope of the independent claims.

The invention claimed is:

1. Sealing element for use with a mold core for use in a molding apparatus for the production of hollow concrete bodies, the mold core comprising a core mantle extending in the longitudinal direction, the core mantle having a strip-shaped longitudinal opening extending between two longitudinal edges of the core mantle in the longitudinal direction of the core mantle, and an expansion device for expanding and/or contracting the mold core, wherein the sealing element has lateral connecting strips extending in the longitudinal direction and a connecting band which is arranged between the connecting strips and is connected to the connecting strips on both sides, wherein a cross-sectional profile of the connecting strips of the sealing element each has one or more retaining profile sections protruding and/or engaging into the material of the connecting band, and wherein the sealing element is configured to be connected to the two longitudinal edges of the core mantle, the lateral connecting strips being configured to be held at the longitudinal edges of the core mantle.

2. Sealing element according to claim 1, wherein the sealing element on the mold core is configured to be removably held to be pulled out and/or can be pulled out in the longitudinal direction from the longitudinal opening of the core mantle.

3. Sealing element according to claim 1, wherein respective longitudinal edges of the sealing member facing the longitudinal edges of the core mantle are respectively configured to be connected to the respective longitudinal edges of the core mantle slidably displaceable in the longitudinal direction.

4. Sealing element according to claim 1, wherein the sealing element is configured to be positively connected to the longitudinal edges of the core mantle in a direction transverse to the longitudinal direction of the mold core in the radial direction of the mold core and/or substantially perpendicular to the radial direction of the mold core relative to the mold core.

5. Sealing element according to claim 1, wherein the lateral connecting strips of the sealing element are configured to be held slidably displaceable in the longitudinal direction at the longitudinal edges of the core mantle at respective fastened fastening strips fastened to the longitudinal edges of the core mantle.

6. Sealing element according to claim 5, wherein the connecting strips of the sealing element have one or more profile groove sections extending in the longitudinal direction, wherein respective corresponding profile rail sections of the fastening strips engage into the profile groove sections slidably displaceable in the longitudinal direction;

and/or the connecting strips of the sealing element have one or more profile rail sections extending in the longitudinal direction, wherein the profile rail sections engage slidably displaceable in the longitudinal direction into respective corresponding profile groove sections of the fastening strips.

7. Sealing element according to claim 6, wherein one or more profile groove sections and/or their corresponding one or more profile rail sections have a T-shape in cross-sectional profile.

8. Sealing element according to claim 1, wherein the connecting band of the sealing element is a flexible and/or elastically bendable connecting band, which comprises an elastic plastic and/or an elastomer.

9. Sealing element according to claim 1, wherein the connecting band of the sealing element is attached to the connecting strips via a non-positive connection and/or via an adhesive connection.

10. Sealing element according to claim 1, wherein the one or more retaining profile sections include one or more anchor and/or nose profile sections.

11. Sealing element according to claim 1, wherein at least one of the connecting strips of the sealing element in the cross-sectional profile has a plurality of holding profile sections aligned transversely to one another and protruding and/or engaging into the material of the connecting band.

12. Mold core for use in a molding apparatus for the production of hollow concrete bodies, the mold core comprising:

a core mantle extending in the longitudinal direction, the core mantle having a strip-shaped longitudinal opening extending between two longitudinal edges of the core mantle in the longitudinal direction of the core mantle, an expansion device for expanding and/or contracting the mold core, and a sealing element sealing the longitudinal opening of the core mantle, wherein the sealing element has lateral connecting strips extending in the longitudinal direction and a connecting band which is arranged between the connecting strips and is connected to the connecting strips on both sides, wherein a cross-sectional profile of the connecting strips of the sealing element each has one or more retaining profile sections protruding and/or engaging into the material of the connecting band, and wherein the sealing element is connected to the two longitudinal edges of the core mantle, the lateral connecting strips of the sealing element being held at the longitudinal edges of the core mantle.

13. Mold apparatus for the production of hollow concrete bodies, comprising:

an outer mold and an inner mold arranged in the outer mold and comprising a mold core, the mold core comprising:

a core mantle extending in the longitudinal direction, the core mantle having a strip-shaped longitudinal opening extending between two longitudinal edges of the core mantle in the longitudinal direction of the core mantle, an expansion device for expanding and/or contracting the mold core, and a sealing element sealing the longitudinal opening of the core mantle, wherein the sealing element has lateral connecting strips extending in the longitudinal direction and a connecting band which is arranged between the connecting strips and is connected to the connecting strips on both sides, wherein a cross-sectional profile of the connecting strips of the sealing element each has one or more retaining profile sections protruding and/or engaging into the material of the connecting band, and wherein the sealing element is connected to the two longitudinal edges of the core mantle, the lateral connecting strips of the sealing element being held at the longitudinal edges of the core mantle.

* * * * *